US012615351B2

(12) United States Patent
Kim

(10) Patent No.: US 12,615,351 B2
(45) Date of Patent: Apr. 28, 2026

(54) ELECTRONIC APPARATUS FOR ADJUSTING PROJECTION REGION BASED ON PROJECTION IMAGE AND CONTROL METHOD THEREOF

(71) Applicant: SAMSUNG ELECTRONICS CO., LTD., Suwon-si (KR)

(72) Inventor: Hyungchul Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 770 days.

(21) Appl. No.: 17/948,897

(22) Filed: Sep. 20, 2022

(65) Prior Publication Data

US 2023/0026947 A1     Jan. 26, 2023

Related U.S. Application Data

(63) Continuation of application No. PCT/KR2022/006379, filed on May 4, 2022.

(30) Foreign Application Priority Data

Jul. 21, 2021     (KR) ........................ 10-2021-0095951

(51) Int. Cl.
     *H04N 9/31*          (2006.01)
     *H04N 5/272*         (2006.01)
(52) U.S. Cl.
     CPC ......... *H04N 9/3147* (2013.01); *H04N 9/3194* (2013.01); *H04N 5/272* (2013.01)
(58) Field of Classification Search
     CPC ........................... H04N 9/3147; H04N 9/3194
     See application file for complete search history.

(56) References Cited

U.S. PATENT DOCUMENTS 6,834,963 B2    12/2004    Kim et al.
6,923,545 B2     8/2005    Kitabayashi
                        (Continued)

FOREIGN PATENT DOCUMENTS

CN          112203071 A     1/2021
JP          2005-24668 A    1/2005
                 (Continued)

OTHER PUBLICATIONS

Communication issued on Jun. 28, 2024 by the European Patent Office for European Patent Application No. 22846012.7.
                        (Continued)

*Primary Examiner* — Bao-Luan Q Le
(74) *Attorney, Agent, or Firm* — Sughrue Mion, PLLC

(57)          ABSTRACT

An electronic device and a control method thereof are provided. The control method of an electronic device includes: projecting, by the electronic device, a first test projection image including at least one marker of a first color while an external device projects a second test projection image including at least one marker of a second color that is different from the first color; obtaining a captured image of projection regions on which the first test projection image and the second test projection image are projected while the projection region on which at least one of the first test projection image or the second test projection image is projected is changed; and identifying an overlapping region between the first test projection image and the second test projection image based on at least one of (1) a third marker of a third color or (ii) the marker of the first color and the marker of the second color, in the captured image, the marker of the third color being the marker of the first color and the marker of the second color overlapping each other, and the third color being different from the first color and the second color.

16 Claims, 35 Drawing Sheets

(56) References Cited

U.S. PATENT DOCUMENTS

| | | | |
|---|---|---|---|
| 7,926,957 B2 | 4/2011 | Miyazawa et al. | |
| 8,406,562 B2 | 3/2013 | Bassi et al. | |
| 9,514,716 B2 * | 12/2016 | Shinozaki | H04N 9/3147 |
| 10,042,244 B2 | 8/2018 | Kim et al. | |
| 10,416,540 B2 * | 9/2019 | Agustin | G06F 3/1446 |
| 10,506,207 B2 * | 12/2019 | Furui | H04N 9/3147 |
| 10,642,142 B2 * | 5/2020 | Inagaki | G03B 21/145 |
| 10,663,844 B2 * | 5/2020 | Urano | H04N 9/3182 |
| 2006/0181685 A1 | 8/2006 | Hasegawa | |
| 2008/0007700 A1 * | 1/2008 | vanBaar | H04N 9/3194 |
| | | | 353/94 |
| 2009/0066723 A1 | 3/2009 | Saito | |
| 2009/0201431 A1 * | 8/2009 | Izumida | H04N 9/3147 |
| | | | 348/747 |
| 2012/0127323 A1 | 5/2012 | Kasuya et al. | |
| 2014/0111536 A1 * | 4/2014 | Shinozaki | G03B 21/147 |
| | | | 353/30 |
| 2017/0048483 A1 * | 2/2017 | Kondo | G06F 3/1446 |
| 2017/0048484 A1 * | 2/2017 | Kondo | H04N 9/3147 |
| 2019/0191134 A1 * | 6/2019 | Urano | H04N 9/3147 |
| 2019/0219903 A1 * | 7/2019 | Agustin | H04N 9/3147 |
| 2019/0238807 A1 * | 8/2019 | Furui | H04N 9/3194 |
| 2019/0278164 A1 * | 9/2019 | Inagaki | G03B 21/145 |
| 2021/0409664 A1 | 12/2021 | Masuda et al. | |
| 2022/0368872 A1 | 11/2022 | Shishido | |

FOREIGN PATENT DOCUMENTS

| | | | |
|---|---|---|---|
| JP | 6345316 B2 | 6/2018 | |
| JP | 2019-134312 A | 8/2019 | |
| JP | 2019-192997 A | 10/2019 | |
| JP | 2019-204034 A | 11/2019 | |
| JP | 2019-212975 A | 12/2019 | |
| JP | 2022-174999 A | 11/2022 | |
| KR | 10-0444986 B1 | 8/2004 | |
| KR | 10-0572784 B1 | 4/2006 | |
| KR | 10-2008-0014712 A | 2/2008 | |
| KR | 10-0860186 B1 | 9/2008 | |
| KR | 10-1066990 B1 | 9/2011 | |
| KR | 10-1305252 B1 | 9/2013 | |
| KR | 10-1314731 B1 | 10/2013 | |
| KR | 10-2016-0106971 A | 9/2016 | |
| KR | 10-2017-0065160 A | 6/2017 | |
| KR | 10-1823437 B1 | 1/2018 | |
| KR | 10-2018-0103277 A | 9/2018 | |
| KR | 10-2019-0072425 A | 6/2019 | |
| WO | 2020/202786 A1 | 10/2020 | |

OTHER PUBLICATIONS

Communication issued on Sep. 18, 2024 by the European Patent Office for European Patent Application No. 22846012.7.

International Search Report and Written Opinion dated Aug. 12, 2022, issued by the International Searching Authority in International Application No. PCT/KR2022/006379 (PCT/ISA/210 and PCT/ISA/237).

Communication issued on Nov. 16, 2025 by the Korean Ministry of Intellectual Property (MOIP) in Korean Patent Application No. 10-2021-0095951.

* cited by examiner

ELECTRONIC APPARATUS FOR ADJUSTING PROJECTION REGION BASED ON PROJECTION IMAGE AND CONTROL METHOD THEREOF

CROSS-REFERENCE TO RELATED APPLICATION(S)

This application is a bypass continuation of International Application No. PCT/KR2022/006379, filed on May 4, 2022, which is based on and claims priority to Korean Patent Application No. 10-2021-0095951, filed on Jul. 21, 2021, in the Korean Intellectual Property Office, the disclosures of which are incorporated by reference herein in their entireties.

BACKGROUND

1. Field

The disclosure relate to an electronic device that projects a projection image, and a control method thereof, and more particularly, to an electronic device that adjusts a projection region based on a projection image, and a control method thereof.

2. Description of Related Art

Various electronic devices having an optical output function, such as a display device, an illumination device, a portable communication device, and a projector, have been developed. Among them, the projector is an electronic device that enlarges and projects light output from a light source to a wall or a screen through a projection lens.

With developments of technology related to the projector, technologies for providing one image by using a plurality of projector devices have appeared. A technology, in which each of a plurality of projector devices projects a test projection image including markers for adjusting a projection position and positions of the markers are adjusted to adjust a projection region of each of the plurality of projector devices, has been proposed.

However, in the related technologies, markers having a single color are used, and the projection region is adjusted based only on an overlapping degree of the markers. Therefore, accuracy in adjustment is low and the adjustment takes a long time, which is problematic.

SUMMARY

Embodiments of the disclosure may overcome the above disadvantages and other disadvantages not described above. Also, the disclosure is not required to overcome the disadvantages described above, and an embodiment of the disclosure may not overcome any of the problems described above.

Provided are an electronic device that adjusts a projection region based on a projection image including markers having a plurality of colors, and a control method thereof.

According to an aspect of the disclosure, a control method of an electronic device that projects a projection image, includes: projecting, by the electronic device, a first test projection image including at least one marker of a first color while an external device projects a second test projection image including at least one marker of a second color that is different from the first color; obtaining a captured image of projection regions on which the first test projection image and the second test projection image are projected while the projection region on which at least one of the first test projection image or the second test projection image is projected is changed; and identifying an overlapping region between the first test projection image and the second test projection image based on at least one of (1) a third marker of a third color or (ii) the marker of the first color and the marker of the second color, in the captured image, the marker of the third color being the marker of the first color and the marker of the second color overlapping each other, and the third color being different from the first color and the second color.

The control method may further include: projecting the first test projection image including a first indicator for guiding the first test projection image and the second test projection image to overlap each other according to an overlapping operation; and projecting the projection image including a second indicator based on identifying that the first test projection image and the second test projection image overlap each other according to the overlapping operation.

The control method may further include: controlling a motor to adjust a projection direction of the projection image to change the projection region on which the first test projection image is projected based on a result of the identifying; and transmitting, to the external device, a control instruction to adjust a projection position based on a result of the identifying.

The control method may further include controlling the motor to fix the projection position of the first test projection image and transmitting, to the external device, a control instruction for fixing the projection position of the second test projection image based on identifying that the first test projection image and the second test projection image overlap each other.

The control method may further include transmitting, to the external device, a control instruction for projecting, on the overlapping region, a same image as an image displayed on the overlapping region among the projection images projected by the electronic device based on identifying that the first test projection image and the second test projection image overlap each other.

The control method may further include: obtaining temperature information of the electronic device and temperature information of the external device based on identifying that the first test projection image and the second test projection image overlap each other; projecting a first projection image on a region other than the overlapping region based on identifying that a temperature of the electronic device is higher than a temperature of the external device based on the temperature information of the electronic device and the temperature information of the external device; and transmitting, to the external device, a control instruction for projecting a second projection image on a region other than the overlapping region based on identifying that the temperature of the electronic device is lower than the temperature of the external device based on the temperature information of the electronic device and the temperature information of the external device.

The control method may further include projecting the projection image for displaying a first image and transmitting, to the external device, a control instruction for projecting the projection image for displaying a second image, based on identifying that the first test projection image and the second test projection image overlap each other, and the overlapping region is smaller than a predetermined set region.

The control method may further include projecting, on a region other than the overlapping region, the projection image based on identifying that the first test projection image and the second test projection image overlap each other, and the overlapping region is included in the region on which the first test projection image is projected.

The control method may further include: based on identifying that the first test projection image and the second test projection image overlap each other, identifying a distance between the external device and the electronic device based on the marker of the third color; outputting first audio and transmitting, to the external device, a control instruction for controlling the external device to output second audio based on identifying that the distance between the external device and the electronic device is equal to or larger than a predetermined distance; and outputting third audio and transmitting, to the external device, a control instruction for controlling the external device to output the third audio based on identifying that the distance between the external device and the electronic device is smaller than the predetermined distance.

The third color may be a color corresponding to a combination of light of the first color and light of the second color.

According to an aspect of the disclosure, an electronic device that projects a projection image, includes: a communication interface; a projector configured to project the projection image; a camera configured to capture an image of a region on which the projection image is projected; a memory configured to store at least one instruction; and a processor configured to execute the at least one instruction to: control the projector to project a first test projection image including at least one marker of a first color while an external device projects a second test projection image including at least one marker of a second color that is different from the first color, obtain, through the camera, a captured image by capturing an image of projection regions on which the first test projection image and the second test projection image are projected while the projection region on which at least one of the first test projection image or the second test projection image is projected is changed, and identify an overlapping region between the first test projection image and the second test projection image based on at least one of (i) a third marker of a third color or (ii) the marker of the first color and the marker of the second color, the marker of the third color being the marker of the first color and the marker of the second color overlapping each other, and the third color being different from the first color and the second color.

The processor may be further configured to execute the at least one instruction to control the projector to project the first test projection image including a first indicator for guiding the first test projection image and the second test projection image to overlap each other according to an overlapping operation, and control the projector to project the projection image including a second indicator based on identifying that the first test projection image and the second test projection image overlap each other according to the overlapping operation.

The electronic device may further include a motor that controls the projector to adjust a projection direction of the projection image, wherein the processor may be further configured to control the motor to change the projection region on which the first test projection image is projected based on a result of the identification, and control the communication interface to transmit, to the external device, a control instruction for adjusting a projection position based on the result of the identification.

The processor may be further configured to execute the at least one instruction to control the motor to fix the projection position of the first test projection image, and control the communication interface to transmit, to the external device, a control instruction for fixing the projection position of the second test projection image, based on identifying that the first test projection image and the second test projection image overlap each other.

The processor further may be configured to execute the at least one instruction to control the communication interface to transmit, to the external device, a control instruction for projecting, on the overlapping region, a same image as an image displayed on the overlapping region among the projection images projected by the electronic device, based on identifying that the first test projection image and the second test projection image overlap each other.

Additional and/or other aspects and advantages of the disclosure will be set forth in part in the description which follows and, in part, will be obvious from the description, or may be learned by practice of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 18 is a sequence diagram for describing an embodiment in which an external display device controls the electronic device and the external device;

DETAILED DESCRIPTION

Hereinafter, embodiments the disclosure will be described in detail with reference to the drawings.

Figure 1:
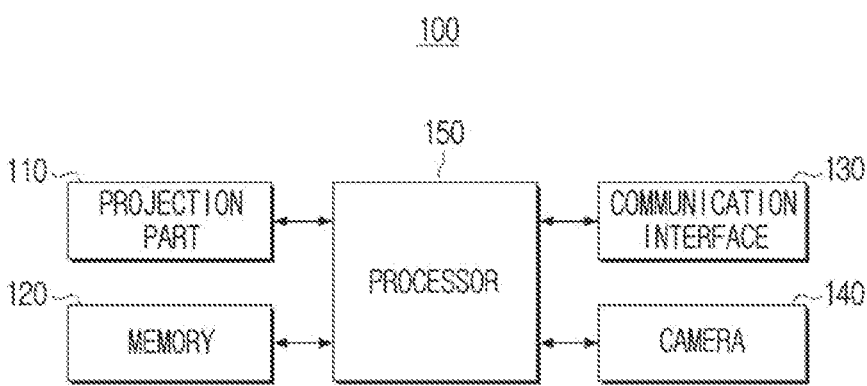
FIG. 1 is a block diagram schematically illustrating a configuration of an electronic device 100 that projects a projection image according to an embodiment of the disclosure.

FIG. 1 is a block diagram schematically illustrating a configuration of an electronic device 100 that projects a projection image according to the disclosure.

The electronic device 100 may be devices in various forms. In particular, the electronic device 100 may be a projector device that enlarges and projects an image to a wall or a screen, and the projector device may be a liquid crystal display (LCD) projector or a digital light processing (DLP) type projector that uses a digital micromirror device (DMD).

Also, the electronic device 100 may be a display device for households or for an industrial use. Alternatively, the electronic device 100 may be an illumination device used in everyday lives, or an audio device including an audio module, and it may be implemented as a portable communication device (e.g., a smartphone), a computer device, a portable multimedia device, a wearable device, or a home appliance, etc. The electronic device 100 according to an embodiment of the disclosure is not limited to the aforementioned devices, and the electronic device 100 may be implemented as an electronic device 100 equipped with two or more functions of the aforementioned devices. For example, the electronic device 100 may be utilized as a display device, an illumination device, or an audio device in a manner in which a projector function of the electronic device 100 is turned off, and an illumination function or a speaker function is turned on according to a manipulation of a processor. Also, the electronic device 100 may include a microphone or a communication device, and may be utilized as an artificial intelligence (AI) speaker.

As illustrated in FIG. 1, the electronic device 100 may include a projection part (also referred to as a projector) 110, a memory 120, a communication interface 130, a camera 140, and a processor 150. The components illustrated in FIG. 1 are only an example. Some of the components may be omitted, and a new component may be added.

The projection part 110 is a component that projects an image to the outside. The projection part 110 according to an embodiment of the disclosure may be implemented in various projection types (for example, a cathode-ray tube (CRT) type, an LCD type, a DLP type, and a laser type). A detailed description of the CRT type, the LCD type, the DLP type, and the laser type will be provided later with reference to FIG. 21.

The projection part 110 may include various types of light sources. For example, the projection part 110 may include at least one of light sources including a lamp, a light emitting diode (LED), and a laser.

The projection part 110 may output an image at an aspect ratio of 4:3, an aspect ratio of 5:4, or a widescreen aspect ratio of 16:9 depending on a use of the electronic device 100, a user setting, or the like, and may output an image at various resolutions such as WVGA (854*480), SVGA (800*600), XGA (1024*768), WXGA (1280*720), WXGA (1280*800), SXGA (1280*1024), UXGA (1600*1200), and Full HD (1920*1080) depending on the aspect ratio.

The projection part 110 may perform various functions for adjusting an output image under the control of the processor

150. For example, the projection part 110 may perform functions such as a zoom function, a keystone function, a quick corner (4-corner) keystone function, and a lens shift function, and a detailed description thereof will be provided later with reference to FIG. 21.

Further, the projection part 110 may project a first test projection image including at least one marker of a first color while an external device projects a second test projection image including at least one marker of a second color. That is, according to the disclosure, the projection part 110 may perform synchronization with another projector device by projecting a test projection image including a marker of a specific color, and a detailed description thereof will be described later.

The memory 120 may store at least one instruction related to the electronic device 100. Further, an operating system (O/S) for driving the electronic device 100 may be stored in the memory 120. Further, various software programs or applications for operating the electronic device 100 may be stored in the memory 120 according to various embodiments of the disclosure. Further, the memory 120 may include a semiconductor memory such as a flash memory, a magnetic storage medium such as a hard disk, and the like.

Specifically, various software programs or applications for operating the electronic device 100 may be stored in the memory 120 according to various embodiments of the disclosure, and the processor 150 may control the operation of the electronic device 100 by executing various software modules stored in the memory 120. That is, the memory 120 is accessed by the processor 150, and reading, recording, correction, deletion, update, and the like, of data in the memory 120 may be performed by the processor 150.

In the disclosure, the term "memory" may include the memory 120, a read only memory (ROM) in the processor 150, a random access memory (RAM), or a memory card mounted on the electronic device 100 (for example, a micro SD card or a memory stick).

The communication interface 130 is a component that performs communication with various types of external devices in various types of communication manners. The communication interface 130 may include a Wi-Fi chip, a Bluetooth chip, a wireless communication chip, and near field communication (NFC) chip. The processor 150 may perform communication with various external devices by using the communication interface 130.

Particularly, the Wi-Fi chip and the Bluetooth chip perform communication in a Wi-Fi manner and a Bluetooth manner, respectively. In case of using the Wi-Fi chip or Bluetooth chip, various connection information such as a service set identifier (SSID) and a session key is first transmitted and received, communication connection is established using the connection information, and various information may then be transmitted and received. The wireless communication chip refers to a chip performing communication according to various communication protocols such as IEEE, Zigbee, 3rd generation (3G), 3rd generation partnership project (3GPP), and long term evolution (LTE). The NFC chip refers to a chip operated by an NFC method using a frequency band of 13.56 MHz among various RF-ID frequency bands such as 135 kHz, 13.56 MHz, 433 MHz, 860 to 960 MHz, and 2.45 GHz.

The electronic device 100 according to the disclosure performs communication with the external device through the communication interface 130, and may receive an image to be projected by the projection part 110, but is not limited thereto. A detailed description thereof will be provided later with reference to FIG. 21.

The camera 140 is a component for capturing a still image or a moving image. According to an embodiment, the camera 140 may include one or more lenses, an image sensor, an image signal processor, or a flash.

Particularly, the camera 140 may obtain a captured image by capturing the test projection image projected by the projection part 110. That is, the lens of the camera 140 may be arranged to be directed in a direction in which light from the light source is projected through the projection part 110. However, embodiments of the disclosure are not limited thereto. In case that a projection angle or a projection direction of the projection image may be adjusted in a state in which a main body of the electronic device 100 is fixed, the camera 140 may be configured to move according to the projection angle or the projection direction of the projection image.

The processor 150 may be electrically coupled to the memory 120 and control an overall operation of the electronic device 100. Specifically, the processor 150 may control the electronic device 100 by executing at least one instruction stored in the memory 120.

Figure 2:
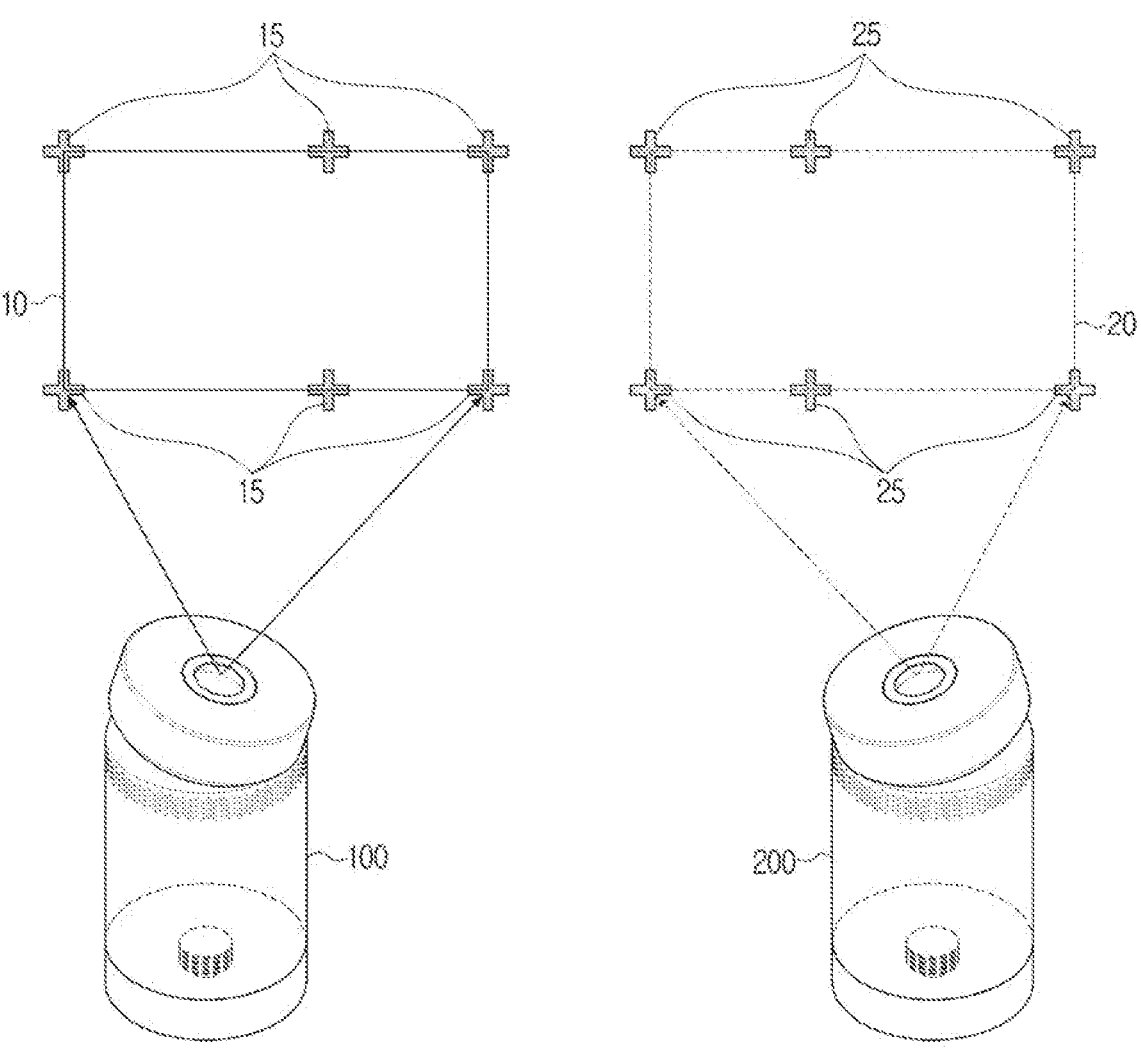
FIG. 2 is a diagram illustrating a state in which each of the electronic device and an external device projects a test projection image including a marker according to an embodiment of the disclosure.

Specifically, the processor 150 may control the projection part 110 to project the first test projection image including the marker of the first color while the external device projects the second test projection image including at least one marker of the second color as illustrated in FIG. 2.

According to an embodiment, once a user input for starting an overlapping operation for projecting the projection image in synchronization with the external device is received, the processor 150 may control the projection part 110 to project the first test projection image including the marker of the first color. Further, once the user input for starting the overlapping operation for projecting the projection image in synchronization with the external device is received, the processor 150 may control the communication interface 130 to transmit, to the external device, a control instruction for projecting the second test projection image including the marker of the second color.

The overlapping operation according to the disclosure is an operation of the electronic device for providing one image by using a plurality of projector devices, and may be performed according to a user instruction for performing the overlapping operation. With the overlapping operation, it is possible to change the aspect ratio by an expansion of a projection region, provide a high-quality image by concentration of the projection region, and provide a screen with a maximum size that is possible in a keystone correction situation. Various overlapping operations will be described later with reference to the following drawings.

FIG. 2 is a diagram illustrating a state in which each of the electronic device 100 and an external device 200 projects a test projection image including a marker according to the disclosure.

Referring to FIG. 2, the external device 200 may project a second test projection image 20 including at least one marker 25 of the second color.

According to an embodiment, the marker 25 of the second color may be displayed at one or more corners of the second test projection image 20, and a position of the marker 25 of the second color may be changed under the control of the external device 200. However, the position of the marker 25 of the second color is not limited to the corner of the second test projection image 20, and may be within a region of the second test projection image 20.

According to an embodiment, the marker of the second color may have a cross shape as illustrated in FIG. 2, but the shape of the marker of the second color is not limited thereto, and the marker of the second color may have various shapes such as a circular shape, a rectangular shape, or a triangular shape. According to an embodiment, a color of the marker of the second color may be one of red, green, and blue. However, embodiments of the disclosure are not limited thereto, and the color of the marker of the second color may be a color other than red, green, and blue.

According to an embodiment, the color of the marker of the second color may be set by the user. For example, in case that the electronic device 100 includes a display, and the processor 150 may control the display to display a user interface (UI) for setting the color of the marker of the second color. Then, once the color of the marker of the second color is set according to a user input received through the UI, the processor 150 may control the communication interface 130 to transmit, to the external device 200, a control instruction for displaying the marker of the second color having the color set according to the user input. For example, in case that the external device 200 is coupled to an external display device including a display, a UI for setting the color of the marker of the second color may be displayed on the external display device. Further, the external display device may transmit, to the external device 200, a control instruction for displaying the marker of the second color having the color set according to the user input received through the UI.

Further, the processor 150 may control the projection part 110 to project a first test projection image 10 including a marker 15 of the first color while the external device 200 projects the second test projection image 20.

According to an embodiment, the marker 15 of the first color may be displayed at one or more of corners of the first test projection image 10, and a position of the marker 15 of the first color may be changed under the control of the processor 150. However, the position of the marker 15 of the first color is not limited to the corner of the first test projection image 10, and may be within a region of the first test projection image 10.

According to an embodiment, the marker of the first color may have a cross shape as illustrated in FIG. 2, but the shape of the marker of the first color is not limited thereto, and the marker of the first color may have various shapes such as a circular shape, a rectangular shape, or a triangular shape. According to an embodiment, a color of the marker of the first color may be one of red, green, and blue, and may be different from the color of the marker of the second color.

According to an embodiment, the color of the marker of the first color may be set by the user. For example, in case that the electronic device 100 includes a display, and the processor 150 may control the display to display a UI for setting the color of the marker of the first color. Then, once the color of the marker of the first color is set according to a user input received through the UI, the processor 150 may control the projection part 110 to display the marker of the first color having the color set according to the user input. For example, in case that the electronic device 100 is coupled to an external display device including a display, a UI for setting the color of the marker of the first color may be displayed on the external display device. Further, the external display device may transmit, to the electronic device 100, a control instruction for displaying the marker of the first color having the color set according to the user input received through the UI.

The processor 150 may obtain a captured image by capturing an image of projection regions on which the first test projection image 10 and the second test projection image 20 are projected through the camera 140 while a projection region on which at least one of the first test projection image 10 or the second test projection image 20 is projected is changed.

According to an embodiment, the projection regions on which the first test projection image 10 and the second test projection image 20 are projected may be manually changed under the control of the user.

Figure 3A:
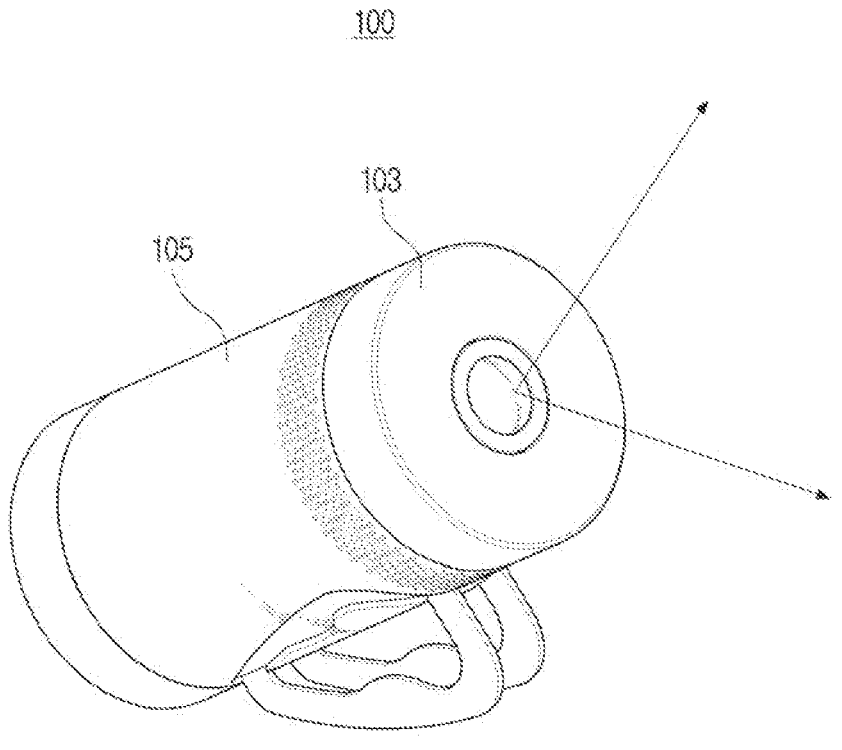
FIG. 3A is a diagram for describing an implementation example of the electronic device according to an embodiment of the disclosure.
Figure 3B:
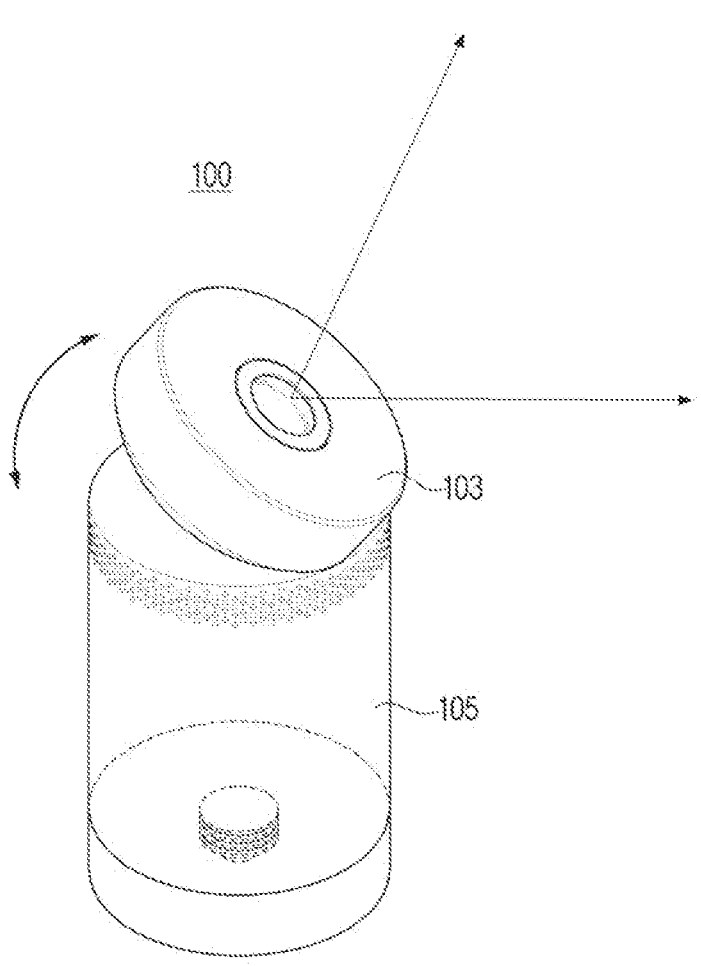
FIG. 3B is a diagram for describing an implementation example of the electronic device according to an embodiment of the disclosure.
Figure 3C:
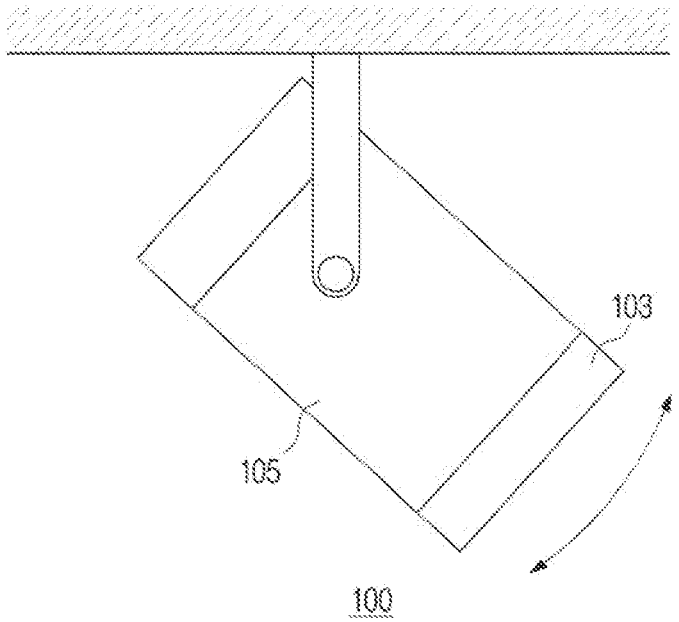
FIG. 3C is a diagram for describing an implementation example of the electronic device according to an embodiment of the disclosure.

FIGS. 3A to 3C are diagrams for describing implementation examples of the electronic device 100 according to the disclosure. That is, referring to FIG. 3A, the projection region of the first test projection image 10 may be changed by adjusting a position or an angle of a main body 105 of the electronic device 100. Further, referring to FIG. 3B, the projection region of the first test projection image 10 may be changed by adjusting an emission angle of the lens while adjusting a direction of a head 103 with respect to the position and the angle of the main body 105 of the electronic device 100. However, embodiments of the disclosure are not limited thereto. In case that the direction of the head 103 of the electronic device 100 is adjusted as illustrated in FIG. 3B, the direction of the head 103 may be adjusted under the control of the processor 150 to automatically change the projection region of the first test projection image 10. However, embodiments of the disclosure are not limited thereto. In case that the main body 105 of the electronic device 100 is automatically rotated as illustrated in FIG. 3C, the direction of the main body 105 may be adjusted under the control of the processor 150 to automatically change the projection region of the first test projection image 10.

Figure 3D:
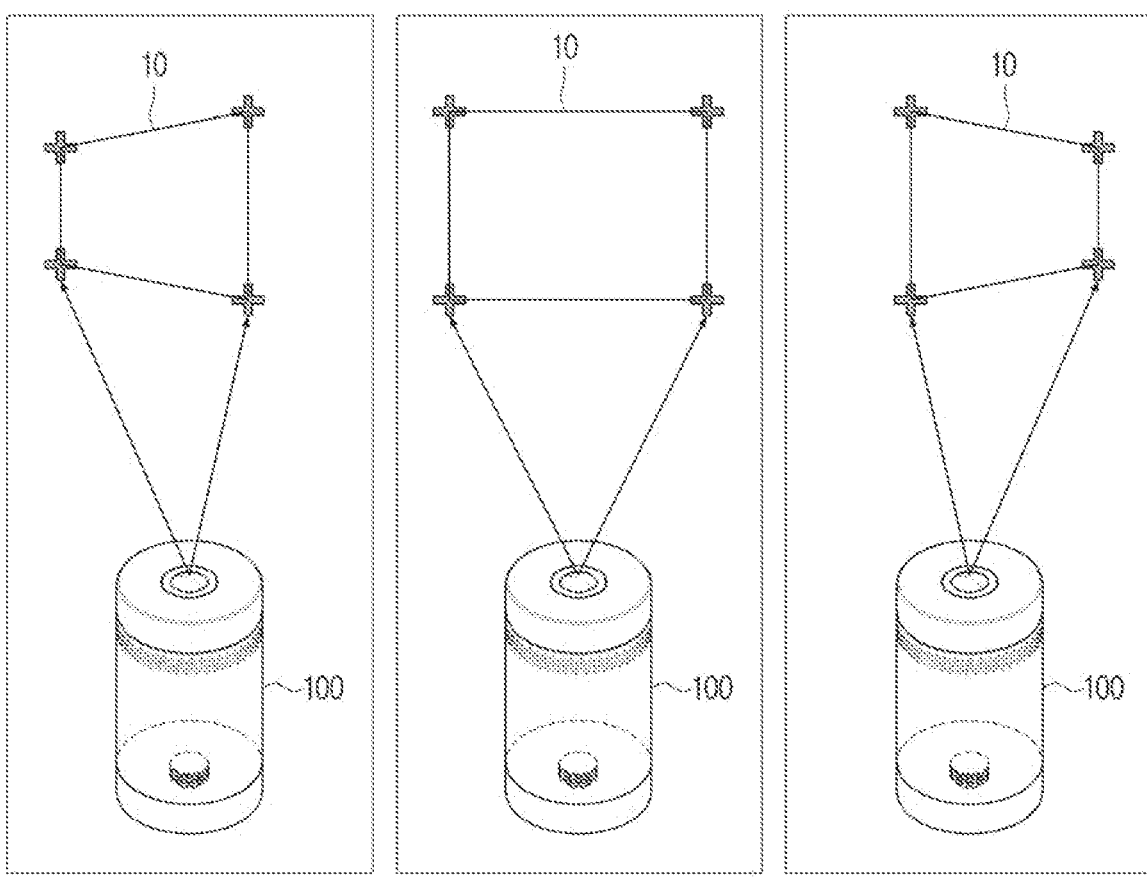
FIG. 3D is a diagram for describing an embodiment in which a projection region of the test projection image is changed by using a horizontal keystone function.
Figure 3E:
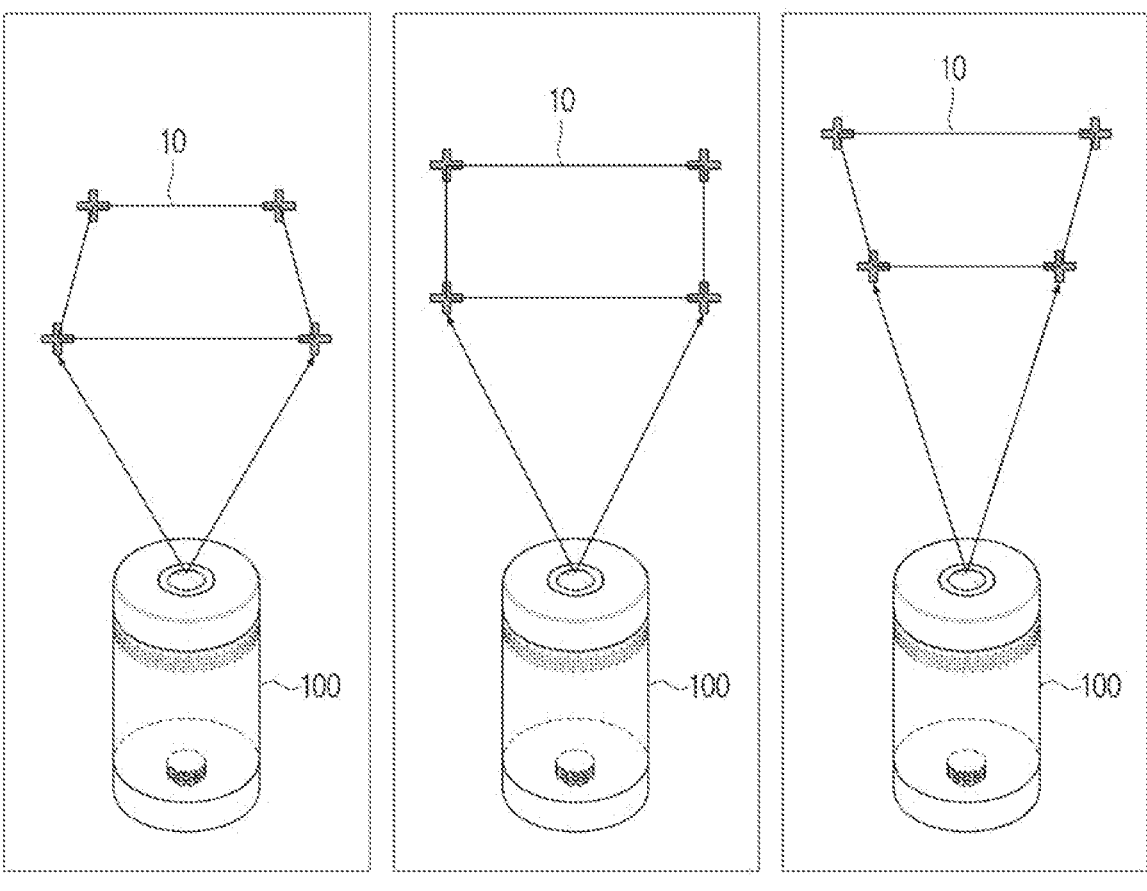
FIG. 3E is a diagram for describing an embodiment in which the projection region of the test projection image is changed by using a vertical keystone function.

According to an embodiment, the processor 150 may change the projection region of the first test projection image 10 by using a keystone function. Further, the processor 150 may control the communication interface 130 to transmit, to the external device 200, a control instruction for changing the projection region of the first test projection image 10 by using the keystone function. FIG. 3D is a diagram for describing an embodiment in which the projection region of the test projection image is changed by using a horizontal keystone function. FIG. 3E is a diagram for describing an embodiment in which the projection region of the test projection image is changed by using a vertical keystone function.

Referring to FIG. 3D, the processor 150 may change the projection region of the first test projection image 10 by using the horizontal keystone function of horizontally moving the projection image. Referring to FIG. 3E, the processor 150 may change the projection region of the first test projection image 10 by using the vertical keystone function of vertically moving the projection image.

The external device 200 may also change the projection region of the second test projection image 20 by using the keystone functions of FIGS. 3D and 3E.

Further, the processor 150 may obtain the captured image by capturing the image of the projection regions on which the first test projection image 10 and the second test projection image 20 are projected, through the camera 140. However, embodiments of the disclosure are not limited thereto. The processor 150 may obtain a first captured image by capturing an image of the projection region on which the first test projection image 10 is projected through the camera 140, and may receive a second captured image obtained by capturing an image of the projection region on which the second test projection image 20 is projected from the external device. Alternatively, according to an embodiment, the processor 150 may receive a captured image obtained by an external camera device capturing an image of the projection regions on which the first test projection image 10 and the second test projection image 20 are projected.

Figure 4:
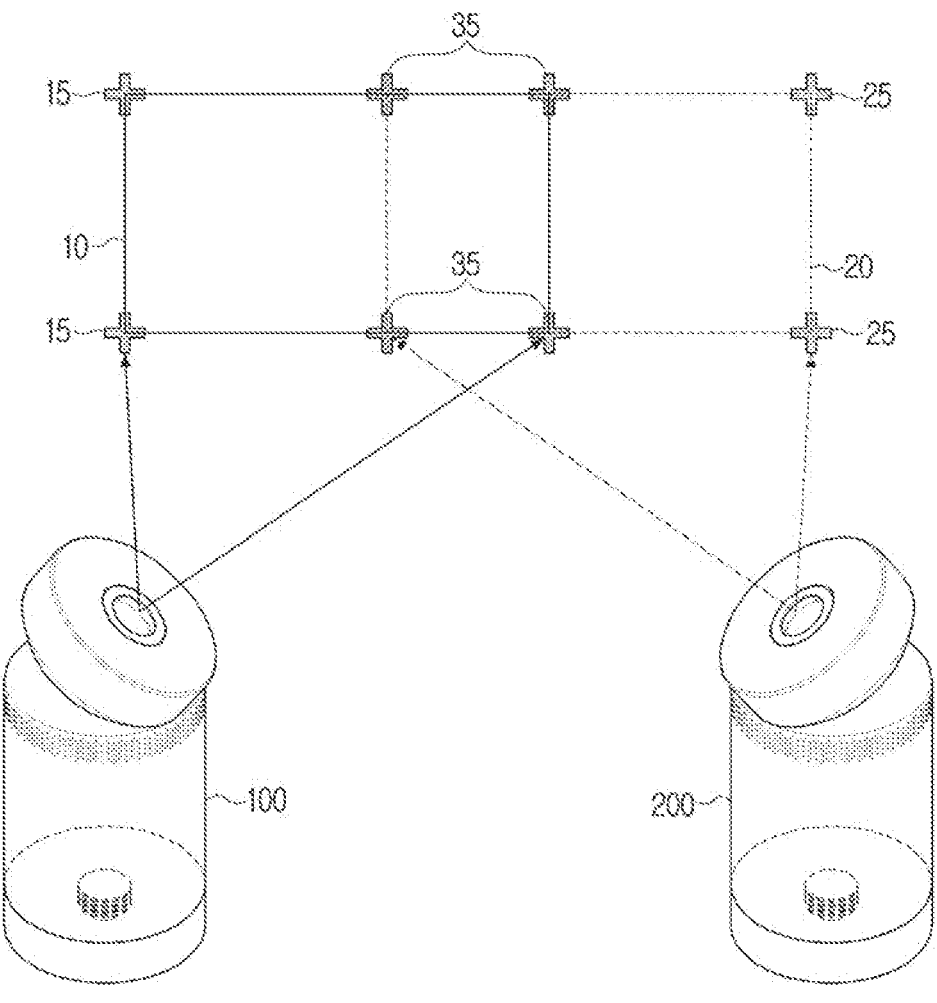
FIG. 4 is a diagram illustrating an embodiment in which the test projection images overlap each other, and a marker of a third color is displayed.

Once the captured image is obtained, the processor 150 may identify the marker 15 of the first color, the marker 25 of the second color, and a marker 35 of a third color in the captured image, the marker 35 of the third color displayed based on the marker 15 of the first color and the marker 25 of the second color overlapping each other. FIG. 4 is a diagram illustrating an embodiment in which the test projection images overlap each other, and the marker 35 of the third color is displayed.

Referring to FIG. 4, the marker 35 of the third color is a marker displayed based on the marker 15 of the first color and the marker 25 of the second color overlapping each other. For example, in case that the marker 15 of the first color is red, and the marker 25 of the second color is green, the marker 35 of the third color may be yellow. That is, the marker 35 of the third color may have a color corresponding to a combination of light of the first color and light of the third color.

Further, the processor 150 may identify an overlapping region between the first test projection image 10 and the second test projection image 20 based on the marker 15 of the first color, the marker 25 of the second color, and the marker 35 of the third color that are identified.

Although a case that the overlapping region is identified by using markers of two colors has been described in the above-described embodiment, embodiments of the disclosure are not limited thereto, and the overlapping region may be identified by using markers of three or more colors.

According to an embodiment, the processor 150 may control the projection part 110 to project the first test projection image including a first indicator for guiding the first test projection image 10 and the second test projection image 20 to overlap each other according to the overlapping operation based on the marker 15 of the first color, the marker 25 of the second color, and the marker 35 of the third color. Further, the processor 150 may control the communication interface 130 to transmit, to the external device, a control instruction for projecting the second test projection image including the first indicator for guiding the first test projection image 10 and the second test projection image 20 to overlap each other according to the overlapping operation. The first indicator will be described later with reference to FIG. 6.

According to an embodiment, once the processor 150 identifies that the first test projection image 10 and the second test projection image 20 overlap each other according to the overlapping operation, the projection image including a second indicator may be projected. The second indicator will be described later with reference to FIG. 7.

According to an embodiment, in case that the projection angle and the projection direction of the projection image are adjusted under the control of the processor 150, the processor 150 may control the projection part 110 to adjust a projection position of the first test projection image 10 based on the marker 15 of the first color, the marker 25 of the second color, and the marker 35 of the third color. For example, in case that the electronic device 100 includes a motor for adjusting the projection direction of the projection part 110, the processor 150 may control the motor to make the first test projection image 10 be projected in a region corresponding to the overlapping operation. Further, the processor 150 may control the communication interface 130 to transmit, to the external device 200, a control instruction for adjusting a projection position of the second test projection image 20 based on the marker 15 of the first color, the marker 25 of the second color, and the marker 35 of the third color. That is, the processor 150 may control the communication interface 130 to transmit, to the external device 200, a control instruction for projecting the second test projection image 20 in a region corresponding to the overlapping operation. Further, once it is identified that the first test projection image 10 and the second test projection image 20 overlap each other, the processor 150 may control the motor to make the projection position of the first test projection image 10 be fixed. Further, the processor 150 may control the communication interface 130 to transmit, to the external device 200, a control instruction for fixing the projection position of the second test projection image 20.

Further, once it is identified that the first test projection image 10 and the second test projection image 20 overlap each other, the processor 150 may control the projection part 110 to project a first projection image. In addition, the processor 150 may control the communication interface 130 to transmit, to the external device 200, a control instruction for controlling the external device 200 to project a second projection image.

According to an embodiment, the processor 150 may control the projection part 110 to display the same image in a region in which a projection region of the first projection image and a projection region of the second projection image overlap each other. Further, the processor 150 may control the communication interface 130 to transmit, to the external device 200, a control instruction for displaying the same image in the region in which the projection region of the first projection image and the projection region of the second projection image overlap each other. A detailed description thereof will be provided later with reference to FIG. 8.

According to an embodiment, once it is identified that the first test projection image 10 and the second test projection image 20 overlap each other, the processor 150 may obtain temperature information of the electronic device 100 and temperature information of the external device 200. According to an embodiment, the electronic device 100 may further include a heat sensor that may detect a heat of the electronic device, and the processor 150 may obtain the temperature information of the electronic device 100 through the heat sensor. Further, the processor 150 may receive the temperature information of the external device 200 from the external device 200 through the communication interface 130.

According to an embodiment, the processor 150 may control the projection part 110 to project the first projection image on a region other than the overlapping region in case that it is identified that a temperature of the electronic device 100 is higher than a temperature of the external device 200 based on the temperature information of the electronic device 100 and the temperature information of the external device 200.

According to an embodiment, the processor 150 may control the communication interface 130 to transmit, to the external device 200, a control instruction for projecting the second projection image on a region other than the overlapping region in case that it is identified that the temperature of the electronic device 100 is lower than the temperature of the external device 200 based on the temperature information of the electronic device 100 and the temperature information of the external device 200. An example using the temperature information will be described later with reference to FIGS. 9A and 9B.

Figure 10:
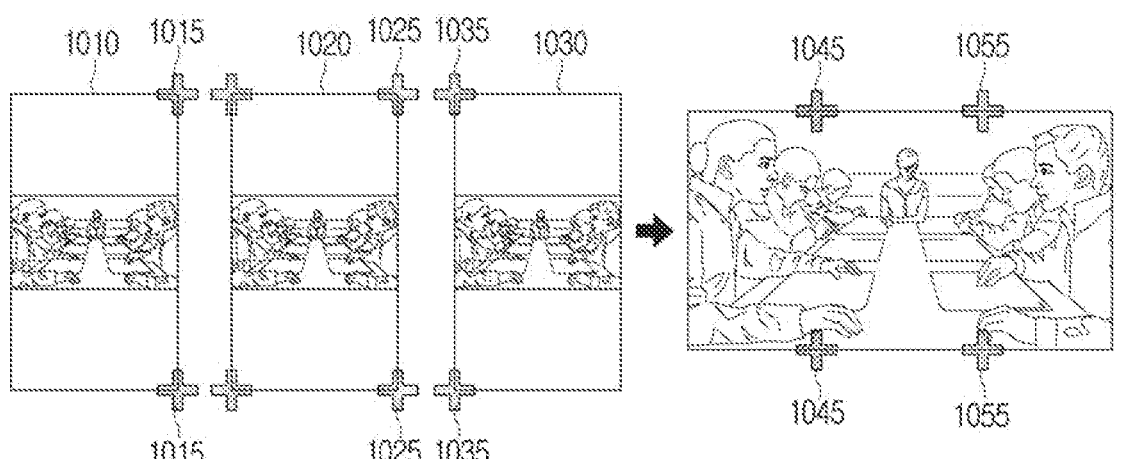
FIG. 10 is a diagram for describing an overlapping operation using the electronic device and two external devices according to an embodiment of the disclosure.
Figure 11:
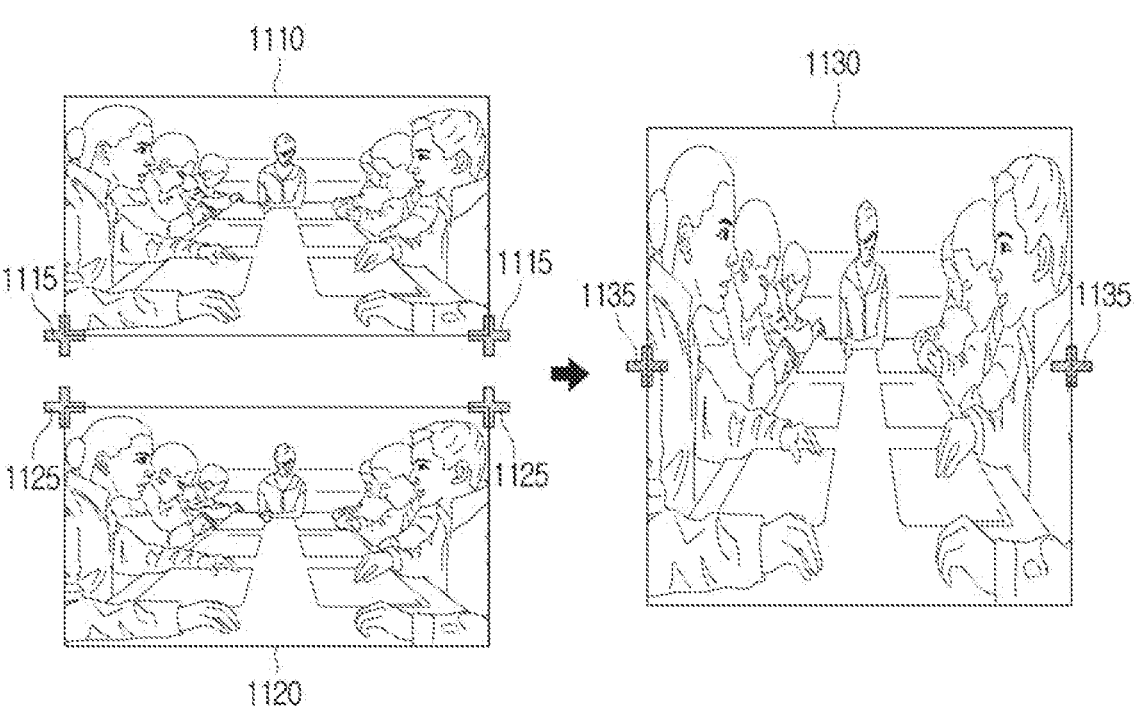
FIG. 11 is a diagram for describing an overlapping operation for expanding a screen according to an embodiment of the disclosure.

According to an embodiment, in case that it is identified that the first test projection image 10 and the second test projection image 20 overlap each other, and the overlapping region is smaller than a predetermined set region, the processor 150 may control the projection part 110 to project the projection image for displaying a first image, and may control the communication interface 130 to transmit, to the external device 200, a control instruction for projecting a second image. That is, as illustrated in FIGS. 10 and 11, in case that the overlapping region is smaller than a first set region of the entire region (for example, less than 10%), the electronic device 100 is controlled to display the first image and the external device 200 is controlled to project the second image different from the first image. As a result, it is possible to provide a screen wider than a screen of a projection image projected by one projector device. An embodiment in which the electronic device 100 and the external device 200 project different images will be described later with reference to FIGS. 10 and 11.

Figure 12:
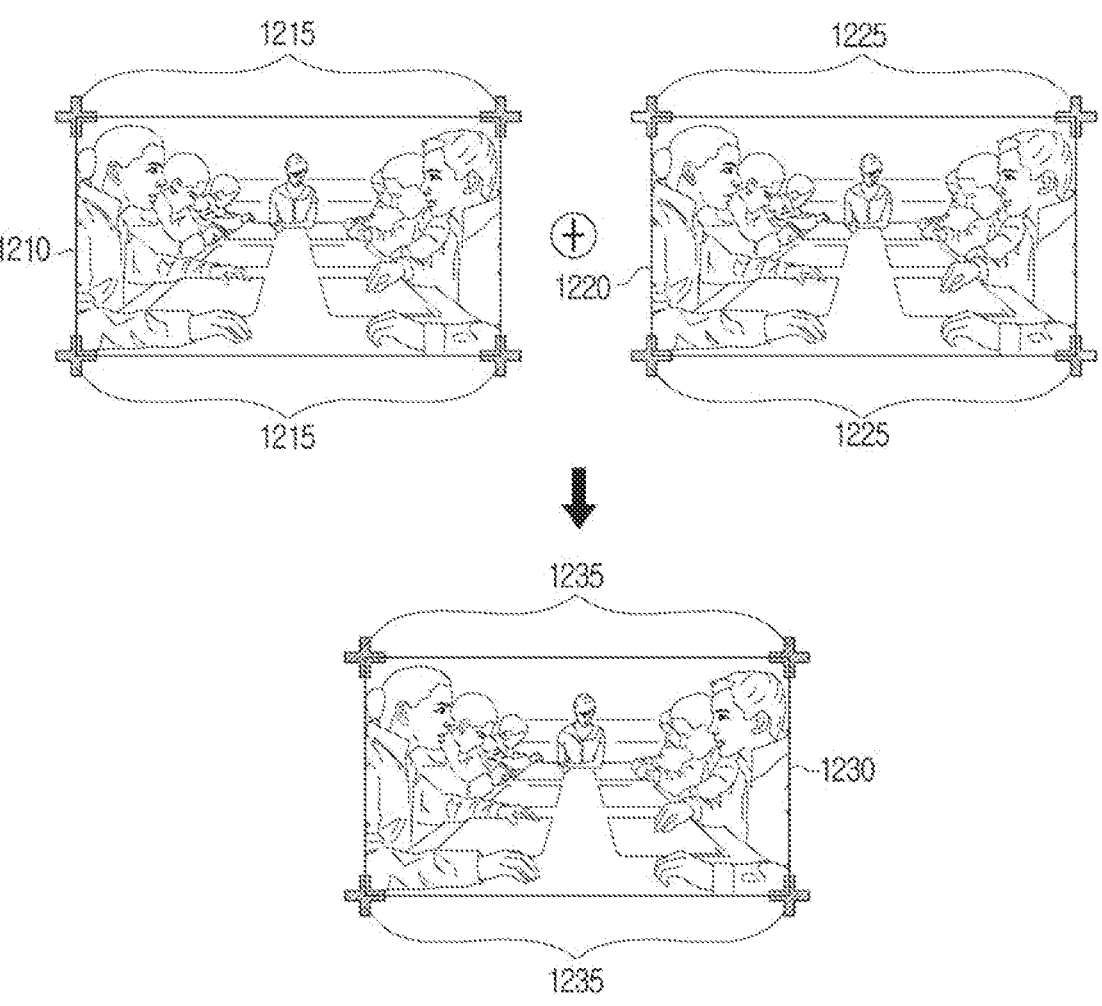
FIG. 12 is a diagram for describing an overlapping operation for providing an image having a higher brightness according to an embodiment of the disclosure.

According to an embodiment, in case that it is identified that the first test projection image 10 and the second test projection image 20 overlap each other, and the overlapping region is smaller than the predetermined set region, the processor 150 may control the projection part 110 to project a third image in the overlapping region, and may control the communication interface 130 to transmit, to the external device 200, a control instruction for projecting the third image in the overlapping region. That is, as illustrated in FIG. 12, in case that the overlapping region is larger than a second set region of the entire region (for example, more than 90%), the electronic device 100 and the external device 200 are controlled to display the same image on the overlapping region. As a result, it is possible to provide a screen brighter than a projection image projected by one projector device. An embodiment in which the electronic device 100 and the external device 200 project the same image will be described later with reference to FIG. 12.

Figure 13A:
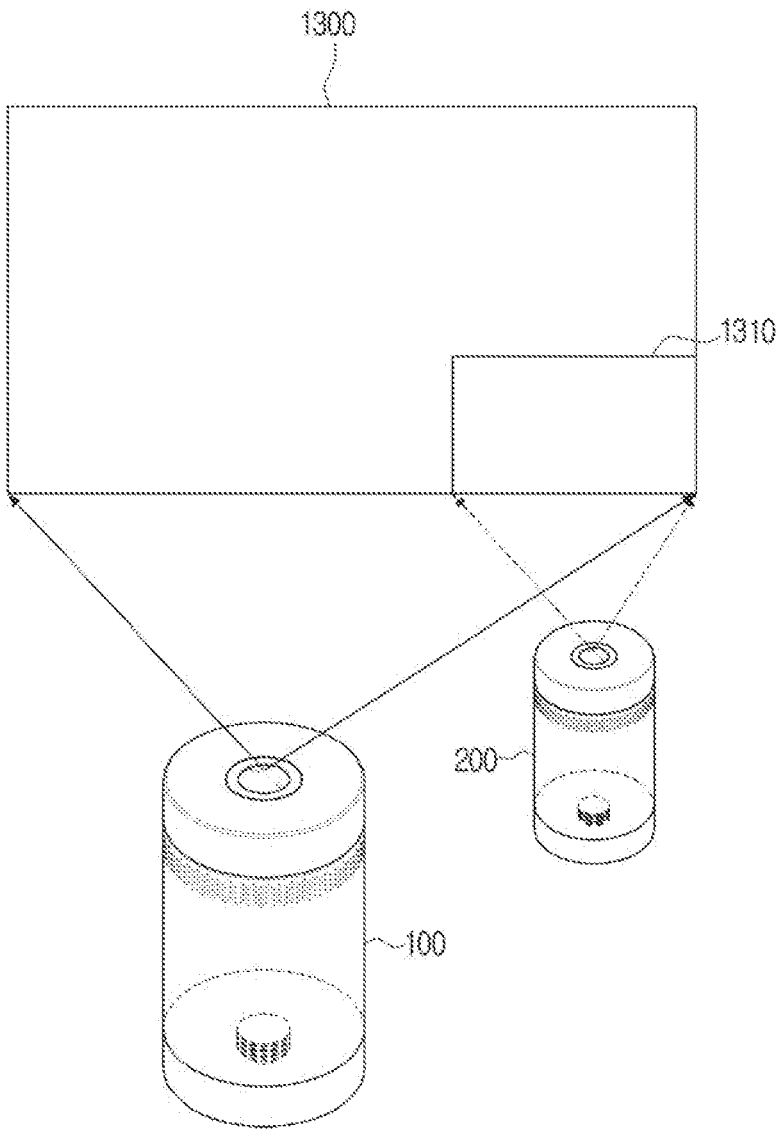
FIG. 13A is a diagram for describing an overlapping operation for providing a picture-in-picture (PIP) function by using a plurality of devices according to an embodiment of the disclosure.
Figure 13B:
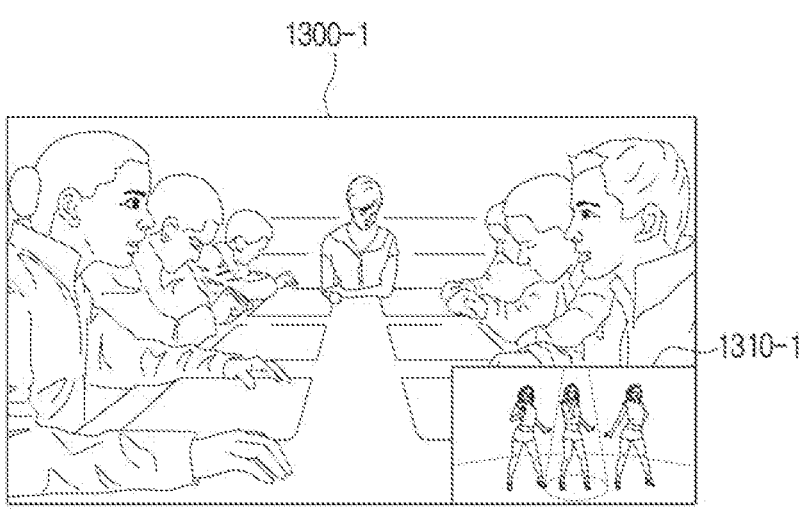
FIG. 13B is a diagram for describing the overlapping operation for providing the PIP function by using a plurality of devices according an embodiment of to the disclosure.

According to an embodiment, in case that it is identified that the first test projection image 10 and the second test projection image 20 overlap each other, and the overlapping region is included in the projection region of the first projection image projected by the electronic device 100, the processor 150 may control the projection part 110 to project the first projection image on a region other than the overlapping region, and may control the communication interface 130 to transmit, to the external device 200, a control instruction for projecting the second projection image on the overlapping region. That is, in case that an overlapping region 1310 is included in a projection region 1300 of a first projection image 1300-1 projected by the electronic device 100 as illustrated in FIG. 13A, the processor 150 may control the projection part 110 to project the first projection image 1300-1 on a region other than the overlapping region 1310, and may control the communication interface 130 to transmit, to the external device 200, a control instruction for projecting a second projection image 1310-1 on the overlapping region 1310 as illustrated in FIG. 13B. A corresponding example will be described later with reference to FIGS. 13A and 13B.

According to an embodiment, once it is identified that the first test projection image 10 and the second test projection image 20 overlap each other, the processor 150 may identify distance information to the external device 200 based on the marker of the third color.

Further, in case that it is identified that a distance between the external device 200 and the electronic device 100 is equal to or larger than a predetermined distance (for example, 3 m or more) based on the distance information, the processor 150 may perform a control to output first audio, and may control the communication interface 130 to transmit, to the external device 200, a control instruction for controlling the external device 200 to output second audio. For example, in case that the electronic device 100 includes an audio output part 2150 of FIG. 21, the processor 150 may control the audio output part 2150 to output the first audio.

In case that the distance between the external device 200 and the electronic device 100 is relatively large, the electronic device 100 may control a device positioned on the left of the user to output audio having a left component, and may control a device positioned on the right of the user to output audio having a right component, thereby providing stereophonic audio.

Further, in case that it is identified that the distance between the external device and the electronic device is smaller than the predetermined distance (for example, less than 3 m) based on the distance information, the processor 150 may perform a control to output third audio, and may control the communication interface 130 to transmit, to the external device 200, a control instruction for controlling the external device 200 to output the third audio. For example, in case that the electronic device 100 includes the audio output part 2150 of FIG. 21, the processor 150 may control the audio output part 2150 to output the third audio.

In case that the distance between the external device 200 and the electronic device 100 is relatively small, the electronic device 100 may perform a control to make the electronic device 100 and the external device 200 output the same audio. An embodiment in which various audios are provided based on the distance information will be described later with reference to FIGS. 15A and 15B.

Figure 5:
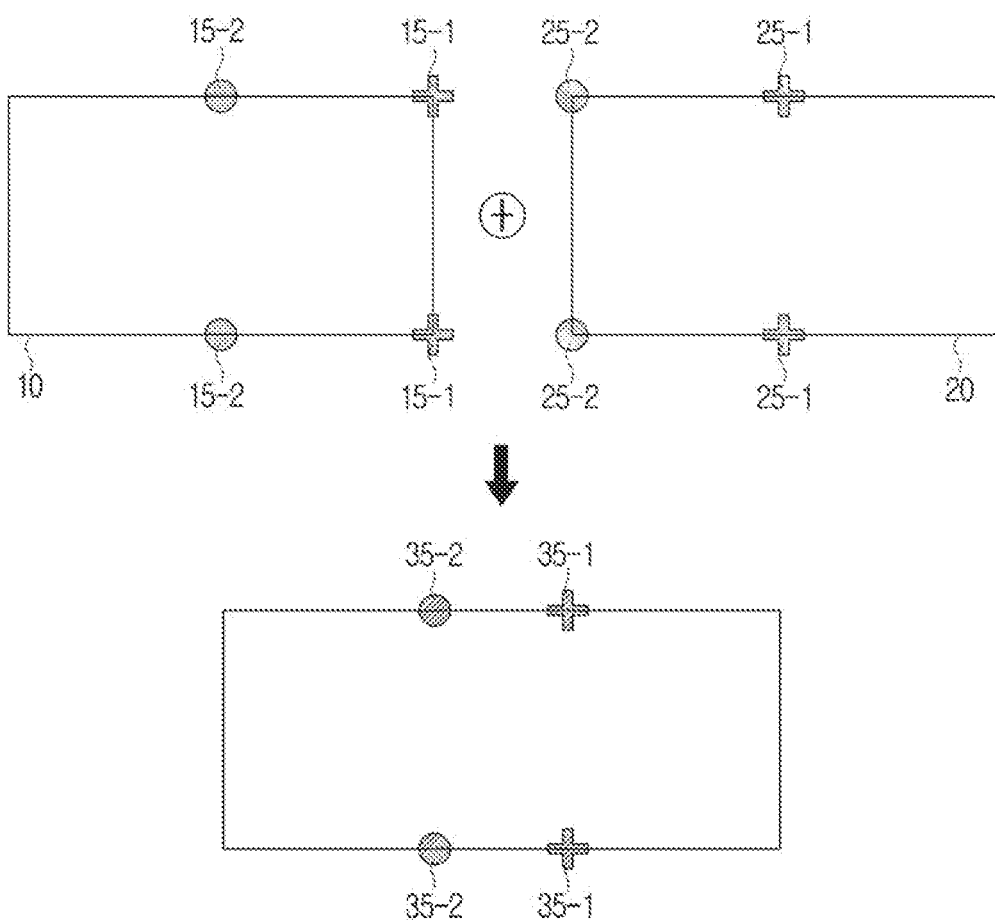
FIG. 5 is a diagram for describing an embodiment in which an overlapping region is identified by using markers having various shapes according to an embodiment of the disclosure.

FIG. 5 is a diagram for describing an embodiment in which the overlapping region is identified by using markers having various shapes according to the disclosure.

According to the disclosure, the marker included in the test projection image may be implemented in various shapes. For example, referring to FIG. 5, a first color cross marker 15-1 and a first color circular marker 15-2 may be included in the first test projection image 10 projected by the electronic device 100. Further, a second color cross marker 25-1 and a second color circular marker 25-2 may be included in the second test projection image 20 projected by the external device 200. For example, the first color cross marker 15-1 and the second color cross marker 25-1 are markers to overlap each other according to the overlapping operation, and the first color circular marker 15-2 and the second color circular marker 25-2 are markers to overlap each other according to the overlapping operation. That is, once a third color cross marker 35-1 is displayed based on the first color cross marker 15-1 and the second color cross marker 25-1 overlapping each other, and a third color circular marker 35-2 is displayed based on the first color circular marker 15-2 and the second color circular marker 25-2 overlapping each other, the processor 150 may identify that the first test projection image 10 and the second test projection image 20 overlap each other according to the overlapping operation.

In case that markers having a plurality of shapes are displayed, and markers to overlap each other according to the overlapping operation have the same shape as illustrated in FIG. 5, the user who adjusts the first test projection image and the second test projection image may more easily adjust the test projection images.

Figure 6:
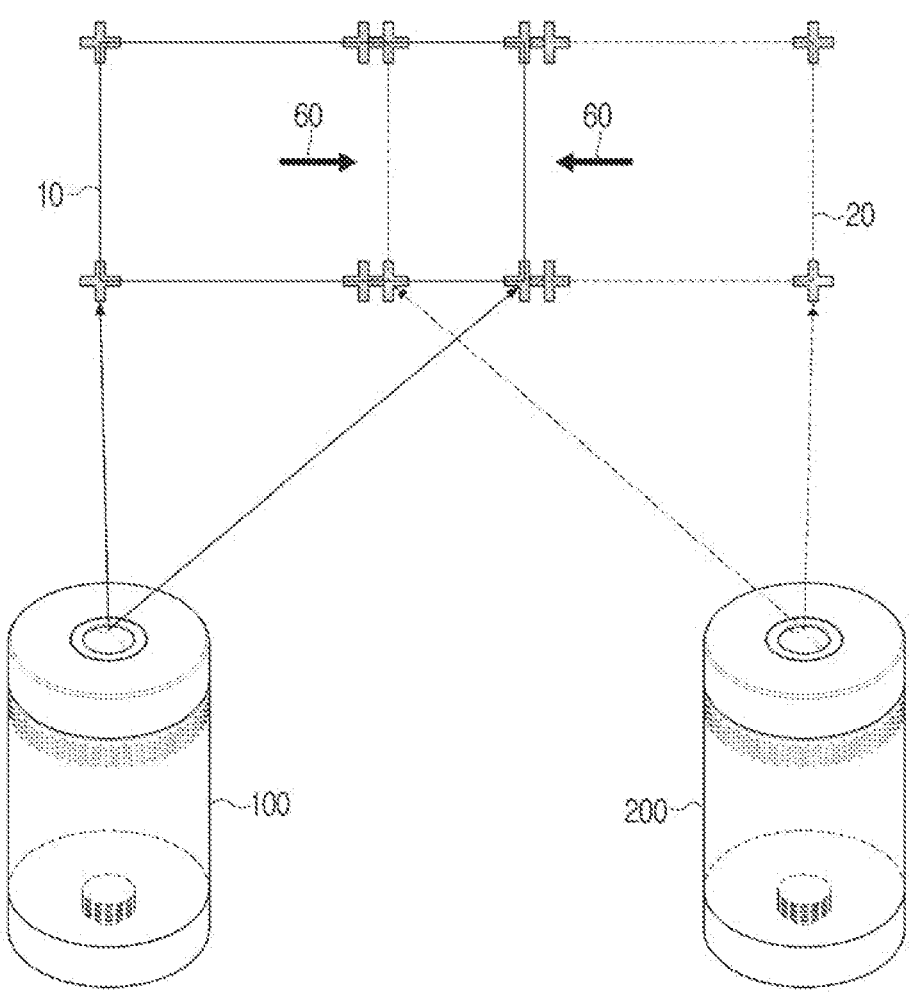
FIG. 6 is a diagram for describing a first indicator for guiding the projection region of the test projection image.
Figure 7:
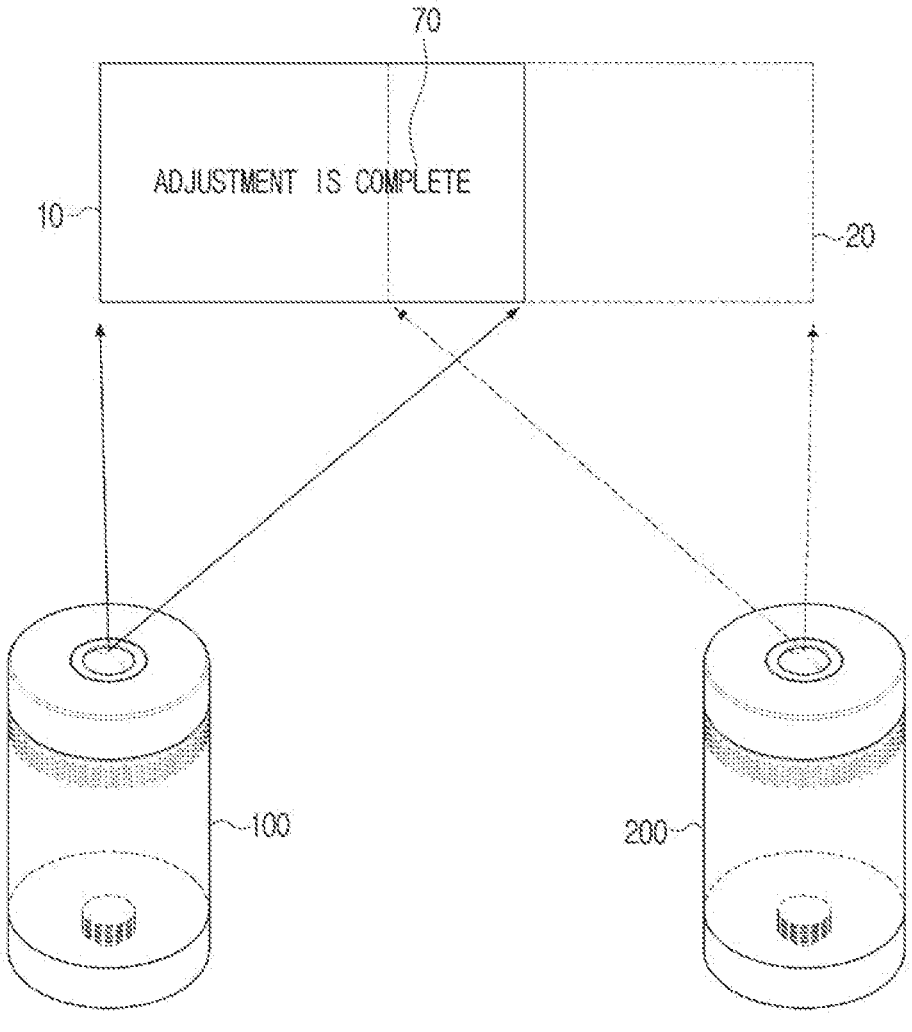
FIG. 7 is a diagram for describing a second indicator for indicating that the test projection images overlap each other according to an overlapping operation.

FIG. 6 is a diagram for describing the first indicator for guiding the projection region of the test projection image. FIG. 7 is a diagram for describing the second indicator for indicating that the test projection images overlap each other according to the overlapping operation.

The processor 150 may identify whether or not the first test projection image and the second test projection image overlap each other according to the overlapping operation based on the marker 15 of the first color, the marker 25 of the second color, and the marker 35 of the third color that are identified in the captured image in which the first test projection image 10 and the second test projection image 20 are captured. In case that it is identified that the first test projection image and the second test projection image do not overlap each other according to the overlapping operation (e.g., the marker 35 of the third color does not exist in the captured image), the processor 150 may control the projection part 110 to project the first test projection image including a first indicator 60, and may control the communication interface 130 to transmit, to the external device 200, a control instruction for projecting the second test projection image including the first indicator 60, thereby guiding the first test projection image and the second test projection image to overlap each other according to the overlapping operation.

The first indicator 60 may be an indicator indicating a direction for changing the projection region of the test projection region as illustrated in FIG. 6. However, embodiments of the disclosure are not limited thereto, and the first indicator 60 may include a text for changing the projection region.

According to an embodiment, the processor 150 may identify whether or not the first test projection image and the second test projection image overlap each other according to the overlapping operation based on the degree of matching between the marker 15 of the first color and the marker 25 of the second color that need to overlap each other according to the overlapping operation in the captured image. That is, the processor 150 may identify whether or not the first test projection image and the second test projection image overlap each other according to the overlapping operation based on the shape of the marker of the third color displayed based on the marker 15 of the first color and the marker 25 of the second color being partially mixed with each other.

The processor 150 may identify that the first test projection image and the second test projection image do not overlap each other according to the overlapping operation in case that the degree of matching between the marker 15 of the first color and the marker 25 of the second color that need to overlap each other according to the overlapping operation is lower than a predetermined value (for example, less than 90%). Then, the processor 150 may control the projection part 110 to project the first test projection image including the first indicator 60, and may control the communication interface 130 to transmit, to the external device 200, the control instruction for projecting the second test projection image including the first indicator 60 as illustrated in FIG. 6.

Further, the processor 150 may identify that the first test projection image and the second test projection image overlap each other according to the overlapping operation in case that the degree of matching between the marker 15 of the first color and the marker 25 of the second color that need to overlap each other according to the overlapping operation is equal to or higher than the predetermined value (for example, equal to or higher than 90%). Then, the processor 150 may control the projection part 110 to project the first test projection image including the second indicator 70 indicating that the first test projection image and the second test projection image overlap each other according to the overlapping operation as illustrated in FIG. 7. The second indicator 70 may include a text as illustrated in FIG. 7, but is not limited thereto. The second indicator 70 may include various indicators indicating that adjustment is completed according to the overlapping operation.

Figure 8:
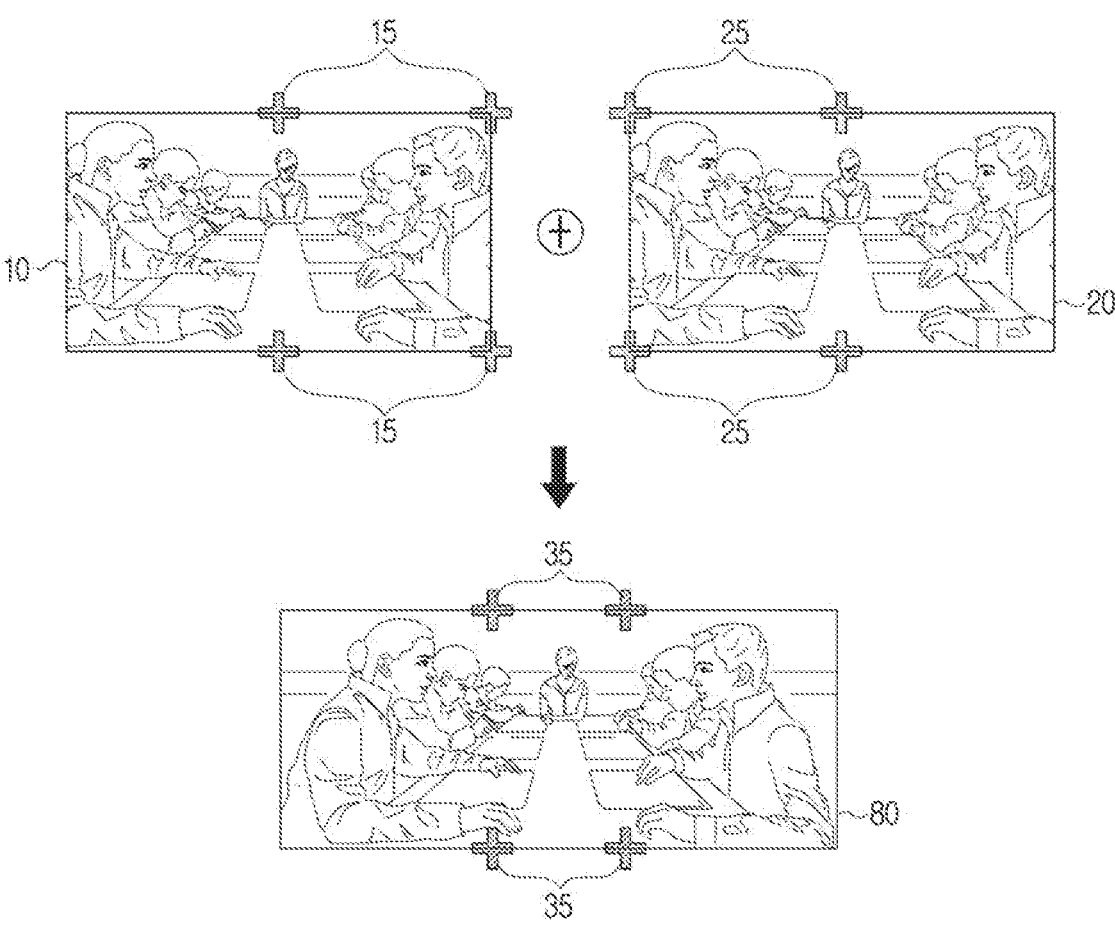
FIG. 8 is a diagram for describing an overlapping operation for increasing an aspect ratio according to an embodiment of the disclosure.

FIG. 8 is a diagram for describing an overlapping operation for increasing the aspect ratio according to the disclosure.

In case that it is identified that the electronic device 100 is operated according to the overlapping operation for increasing the aspect ratio, the processor 150 may control the projection part 110 to project the first test projection image 10 including the marker 15 of the first color to adjust the test projection image according to the overlapping operation for increasing the aspect ratio, and may control the communication interface 130 to transmit, to the external device 200, a control instruction for projecting the second test projection image 20 including the marker 25 of the second color.

That is, the marker 15 of the first color and the marker 25 of the second color may be displayed to make a partial region of the first test projection image and a partial region of the second test projection image overlap each other according to the overlapping operation for increasing the aspect ratio as illustrated in FIG. 8.

Further, it is possible to identify whether or not the test projection images are adjusted according to the overlapping operation for increasing the aspect ratio based on the marker 35 of the third color displayed based on the marker 15 of the first color and the marker 25 of the second color overlapping each other. For example, it is possible to identify that the first test projection image and the second test projection image overlap each other according to the overlapping operation for increasing the aspect ratio in case that the degree of matching between the marker 15 of the first color and the marker 25 of the second color is equal to or higher than the predetermined value (for example, equal to or higher than 90%).

Further, the processor 150 may control the projection part 110 to project one image in a projection region 80 of the first test projection image 10 and the second test projection image 20 according to the overlapping operation for increasing the aspect ratio. Further, the processor 150 may control the communication interface 130 to transmit, to the external device 200, a control instruction for displaying one image in the projection region 80.

For example, in case that the electronic device 100 projects the first test projection image 10 at an aspect ratio of 16:9, and the external device 200 projects the second test projection image 20 at an aspect ratio of 16:9, an aspect ratio of the projection region 80 according to the overlapping operation may be 21:9. That is, it is possible to provide an aspect ratio greater than an existing aspect ratio available in the electronic device 100 and the external device 200 without causing a decrease in size of the projection image according to the overlapping operation according to the disclosure.

Figure 9A:
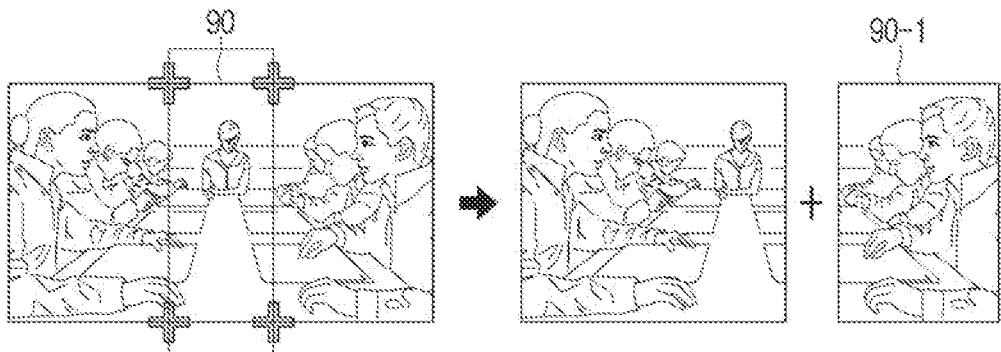
FIG. 9A is a diagram for describing an embodiment in which the projection image displayed in the overlapping region is controlled based on temperature information during the overlapping operation.
Figure 9B:
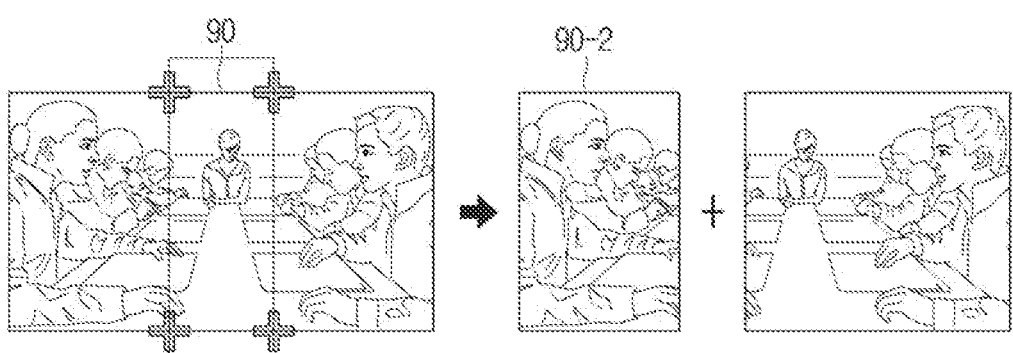
FIG. 9B is a diagram for describing an embodiment in which the projection image displayed in the overlapping region is controlled based on the temperature information during the overlapping operation.

FIGS. 9A and 9B are diagrams for describing an embodiment in which the projection image displayed in the overlapping region is controlled based on the temperature information during the overlapping operation.

As described above with reference to FIG. 8, in case that the first test projection image 10 and the second test projection image 20 are adjusted according to the overlapping operation for increasing the aspect ratio, the processor 150 may obtain the temperature information of the electronic device 100 and the temperature information of the external device 200. According to an embodiment, the electronic device 100 may further include a heat sensor that may detect a heat of the electronic device, and the processor 150 may obtain the temperature information of the electronic device 100 through the heat sensor. Further, the processor 150 may receive the temperature information of the external device 200 from the external device 200 through the communication interface 130.

Further, in case that it is identified that the temperature of the electronic device 100 is lower than the temperature of the external device 200 based on the temperature information of the electronic device 100 and the temperature information of the external device 200, the processor 150 may control the communication interface 130 to transmit, to the external device 200, a control instruction for projecting the projection image on a region 90-1 other than an overlapping region 90 in a region on which the external device 200 projects the projection image as illustrated in FIG. 9A.

Further, in case that it is identified that the temperature of the electronic device 100 is higher than the temperature of the external device 200 based on the temperature information of the electronic device 100 and the temperature information of the external device 200, the processor 150 may control the projection part 110 to project the projection image on a region 90-2 other than the overlapping region 90 in a region on which the electronic device 100 projects the projection image as illustrated in FIG. 9B.

The processor 150 may perform the above-described process by obtaining the temperature of the electronic device 100 and the external device 200 at predetermined time intervals (for example, every five minutes).

FIG. 10 is a diagram for describing an overlapping operation using the electronic device and two external devices according to the disclosure.

Although the overlapping operation performed between the electronic device 100 and the external device 200 has been described in the above-described embodiment, embodiments of the disclosure are not limited thereto, and an overlapping operation using three or more devices may be provided.

In case that it is identified that the electronic device 100 is operated according to an overlapping operation using three devices, the electronic device 100 may project a first test projection image 1010 to project an image whose vertical length is larger than a horizontal length as illustrated in FIG. 10. Further, the electronic device 100 may project the first test projection image 1010 to display a marker 1015 of the first color. According to an embodiment, the marker 1015 of the first color may be displayed at a right corner of the first test projection image 1010 as illustrated in FIG. 10.

Further, a first external device may project a second test projection image 1020 to project an image whose vertical length is larger than a horizontal length as illustrated in FIG. 10. The first external device may project the second test projection image 1020 to display a marker 1025 of the second color. According to an embodiment, the marker 1025 of the second color may be displayed at a corner of the second test projection image 1020 as illustrated in FIG. 10.

Further, a second external device may project a third test projection image 1030 to project an image whose vertical length is larger than a horizontal length as illustrated in FIG. 10. The second external device may project the third test projection image 1030 to display a marker 1035 of the third color. According to an embodiment, the marker 1035 of the third color may be displayed at a left corner of the third test projection image 1030 as illustrated in FIG. 10.

Further, once a marker 1045 of a fourth color is displayed based on the marker 1015 of the first color and the marker 1025 of the second color being mixed with each other, and a marker 1055 of a fifth color is displayed based on the marker 1025 of the second color and the marker 1035 of the third color being mixed with each other, the electronic device 100 may identify that image adjustment is made according to the overlapping operation using three devices. The electronic device 100 may control the first external device and the second external device to display one image in a projection region adjusted based on the first test projection image 1010, the second test projection image 1020, and the third test projection image 1030.

FIG. 11 is a diagram for describing an overlapping operation for expanding the screen according to the disclosure.

The overlapping operation according to the disclosure may include an overlapping operation for expanding the projection region in a manner in which the electronic device 100 and the external device 200 project different images, respectively.

Referring to FIG. 11, the processor 150 may control the projection part 110 to project a first test projection image 1110 including a marker 1115 of the first color on an upper side of the projection region, and may control the communication interface 130 to transmit, to the external device 200, a control instruction for projecting a second test projection image 1120 including a marker 1125 of the second color on a lower side of the projection region.

According to an embodiment, the marker 1115 of the first color may be positioned at a lower side corner of the first test projection image 1110, and the marker 1125 of the second color may be positioned at an upper side corner of the second test projection image 1120 as illustrated in FIG. 11.

Further, once a marker 1135 of the third color is displayed in a projection region 1130 based on the marker 1115 of the first color and the marker 1125 of the second color overlapping each other, the processor 150 may identify that the first test projection image 1110 and the second test projection image 1120 overlap each other according to the overlapping operation for expanding the screen.

In addition, the processor 150 may control the projection part 110 to project the first image, and may control the communication interface 130 to transmit, to the external device 200, a control instruction for projecting the second image. For example, the first image and the second image may be combined, and one image may be provided in the projection region 1130 as illustrated in FIG. 11. The first image may be an image on the upper side in the image provided in the projection region 1130, and the second image may be an image on the lower side in the image provided in the projection region 1130.

The electronic device 100 may provide a wider projection image by expanding the projection region according to the above-described embodiment.

FIG. 12 is a diagram for describing an overlapping operation for providing an image having a higher brightness according to the disclosure.

The overlapping operation according to the disclosure may include the overlapping operation for providing an image having a higher brightness in a manner in which the electronic device 100 and the external device 200 project the same image on the same region.

Referring to FIG. 12, the processor 150 may control the projection part 110 to project a first test projection image 1210 including markers 1215 of the first color, and may control the communication interface 130 to transmit, to the external device 200, a control instruction for projecting a second test projection image 1220 including markers 1225 of the second color.

According to an embodiment, the markers 1215 of the first color may be positioned at corners of the first test projection image 1210, and the markers 1225 of the second color may be positioned at corners of the second test projection image 1220 as illustrated in FIG. 12.

Further, once markers 1235 of the third color are displayed in a projection region 1230 based on all of the marker of the first color 1215 and the marker of the second color 1225 overlapping each other, the processor 150 may identify that the first test projection image 1210 and the second test projection image 1220 overlap each other according to the overlapping operation for providing an image having a higher brightness.

In addition, the processor 150 may control the projection part 110 to project an image, and may control the communication interface 130 to transmit, to the external device 200, a control instruction for projecting the same image as that projected by the electronic device 100. For example, the images projected by the electronic device 100 and the external device 200 may be combined to provide one image in the projection region 1230 as illustrated in FIG. 12.

The electronic device 100 may provide an image having a higher brightness according to the above-described embodiment.

FIGS. 8 to 12 illustrate a case that the marker of the first color and the marker of the second color corresponding to each of the overlapping operations are displayed in the first test projection image and the second test projection image. That is, the first test projection image and the second test projection image projected in FIGS. 8 and 12 include the marker of the first color and the marker of the second color positioned at positions corresponding to the overlapping operation, respectively.

In other words, in the embodiment illustrated in FIGS. 8 to 12, once a user input that selects one of the plurality of overlapping operations is received, the marker of the first color and the marker of the second color may be displayed at positions corresponding to the selected overlapping operation.

However, embodiments of the disclosure are not limited thereto, and it is possible to identify a corresponding overlapping operation among the plurality of overlapping operations based on a result of test projection image adjustment performed by the user after a user input for starting the overlapping operation is received. Specifically, once the user input for starting the overlapping operation is received, the marker of the first color is displayed at a corner of the first test projection image, and the marker of the second color is displayed in the second test projection image. Then, once the projection region is determined according to the test projection image adjustment performed by the user, one of the plurality of overlapping operations may be identified based on the determined projection region, the marker of the first color, the marker of the second color, and the number of markers of the third color.

For example, in case that the markers of the first color are displayed at corners of the first test projection image, the markers of the second color are displayed in the second test projection image, and the second test projection image is positioned below the first test projection image as illustrated in FIG. 11 according to the adjustment performed by the user, the processor 150 may identify that the corresponding overlapping operation is the overlapping operation for expanding the screen based on the determined projection region 1130, the markers of the first color displayed at upper side corners of the first test projection image, the markers of the second color displayed at lower side corners of the second test projection image, and the number of markers 1135 of the third color.

FIG. 13A is a diagram for describing an overlapping operation for providing a picture-in-picture (PIP) function by using a plurality of devices according to the disclosure. FIG. 13B is a diagram for describing the overlapping operation for providing the PIP function by using a plurality of devices according to the disclosure.

The overlapping operation according to the disclosure may include an overlapping operation for providing a plurality of images in a manner in which the electronic device 100 and the external device 200 project different images, respectively.

According to an embodiment, referring to FIG. 13A, in case that it is identified that the first test projection image and the second test projection image overlap each other, and an overlapping region 1310 is included in a projection region 1300 on which the first test projection image is projected, the processor 150 may control the projection part 110 and the communication interface 130 to be operated according to the overlapping operation for providing the PIP function. That is, in case that the external device 200 is positioned closer to the projection region than the electronic device 100 is, the image projected by the external device 200 may be included in the image projected by the electronic device 100 as illustrated in FIG. 13A. However, embodiments of the disclosure are not limited thereto. Even in case that the external device 200 is positioned at the same position as that of the electronic device 100, the image projected by the external device 200 may be included in the image projected by the electronic device 100 by enlarging or reducing at least one of the projection image projected by the external device 200 or the projection image projected by the electronic device 100.

Specifically, referring to FIG. 13B, the projection part 110 may be controlled to project a first image 1300-1 on a region other than the overlapping region 1310 of FIG. 13A. Further, the processor 150 may control the communication interface 130 to transmit, to the external device 200, a control instruction for projecting a second image 1310-1 on the overlapping region 1310 of FIG. 13A.

The electronic device 100 may provide a plurality of images even in case that the projection region is limited.

Figure 14:
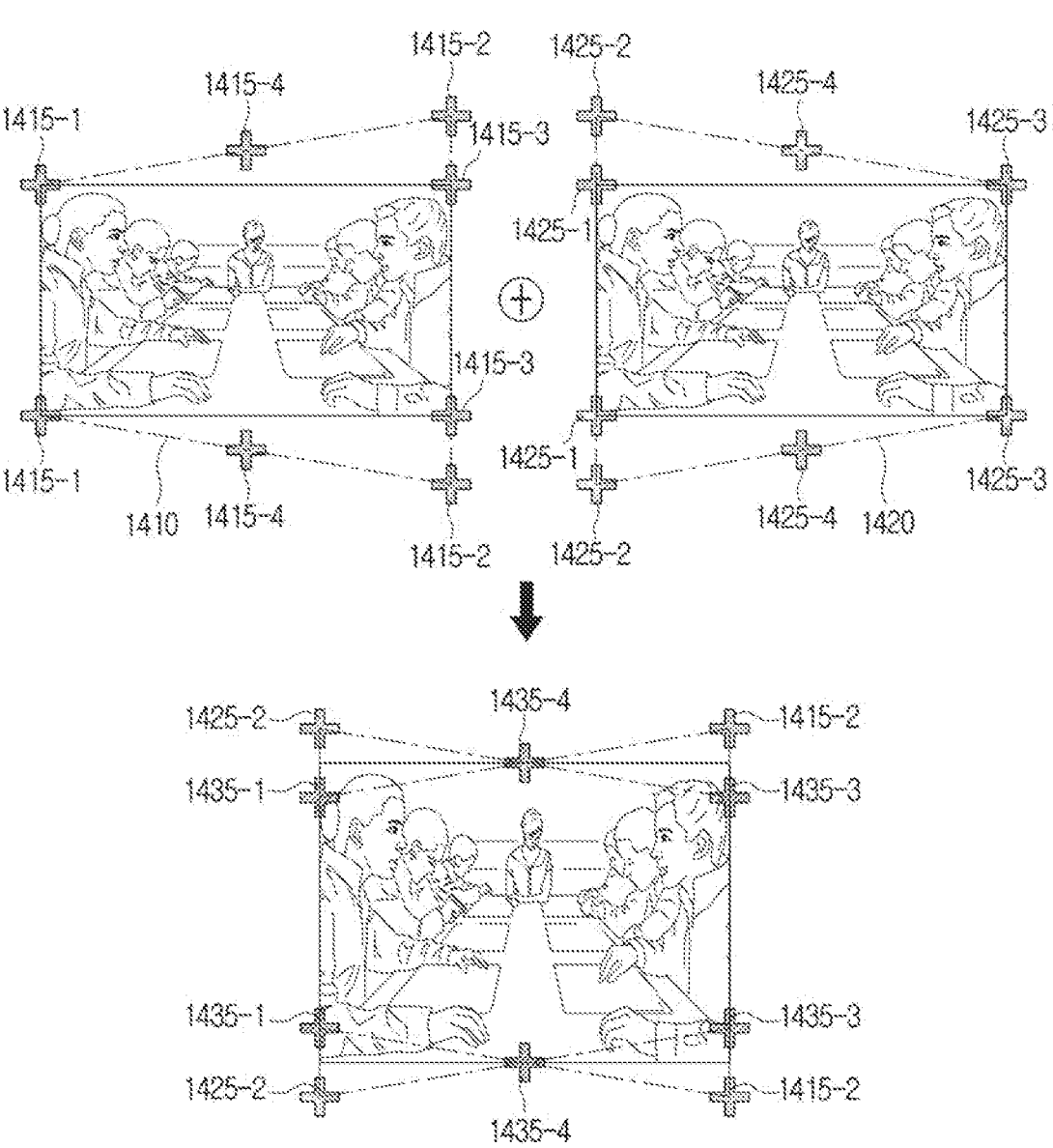
FIG. 14 is a diagram for describing an overlapping operation for providing one image by using a plurality of projection images subjected to keystone correction according to an embodiment of the disclosure.

FIG. 14 is a diagram for describing an overlapping operation for providing one image by using a plurality of projection images subjected to keystone correction according to an embodiment of the disclosure.

According to an embodiment, each of the electronic device 100 and the external device 200 may project a projection image subjected to keystone correction due to spatial constraints of the electronic device 100 and the external device 200. In this case, one enlarged image may be provided by using the overlapping operation according to the disclosure.

Referring to FIG. 14, the processor 150 may control the projection part 110 to project a first test projection image 1410 including markers 1415-1, 1415-2, 1415-3, and 1415-4 of the first color, and may control the communication interface 130 to transmit, to the external device 200, a control instruction for projecting a second test projection image 1420 including markers 1425-1, 1425-2, 1425-3, and 1425-4 of the second color.

According to an embodiment, as illustrated in FIG. 14, the markers of the first color 1415-1, 1415-2, 1415-3, and 1415-4 may include a 1-1-th marker 1415-1 positioned at a left corner of the first test projection image 1410, a 1-2-th marker 1415-2 positioned at a right corner of the first test projection image 1410, a 1-3-th marker 1415-3 positioned at a point where a horizontal point of the 1-1-th marker 1415-1 and a vertical point of the 1-2-th marker 1415-2 meet each other, and a 1-4-th marker 1415-4 positioned at an intermediate point between the 1-1-th marker 1415-1 and the 1-2-th marker 1415-2.

Further, as illustrated in FIG. 14, the markers of the second color 1425-1, 1425-2, 1425-3, and 1425-4 may include a 2-2-th marker 1425-2 positioned at a left corner of the second test projection image 1420, a 2-3-th marker 1425-3 positioned at a right corner of the second test projection image 1420, a 2-1-th marker 1425-1 positioned at a point where a horizontal point of the 2-3-th marker 1425-3 and a vertical point of the 2-2-th marker 1425-2 meet each other, and a 2-4-th marker 1425-4 positioned at an intermediate point between the 2-2-th marker 1425-2 and the 2-3-th marker 1425-3.

Further, once a 3-1-th marker 1435-1 is displayed based on the 1-1-th marker 1415-1 and the 2-1-th marker 1425-1 being mixed with each other, a 3-3-th marker 1435-3 is displayed based on the 1-3-th marker 1415-3 and the 2-3-th marker 1425-3 being mixed with each other, and a 3-4-th marker 1435-4 is displayed based on the 1-4-th marker 1415-4 and the 2-4-th marker 1425-4 being mixed with each other, the processor 150 may identify that the first test projection image 1410 and the second test projection image 1420 properly overlap each other according to the overlapping operation. Here, the overlapping operation may be the overlapping operation for providing one image by using a plurality of projection images subjected to keystone correction.

Further, once it is identified that the first test projection image 1410 and the second test projection image 1420 overlap each other according to the overlapping operation, the processor 150 may control the projection part 110 and the communication interface 130 to project the projection images in a horizontal region between the 3-1-th marker 1435-1 and the 3-3-th marker 1435-3 and a vertical region between the 3-4-th markers 1435-4.

Although an embodiment in which the size of the first test projection image 1410 and the size of the second test projection image 1420 are the same as each other has been described in FIG. 14, embodiments of the disclosure are not limited thereto. That is, in case that the size of the first test projection image 1410 and the size of the second test projection image 1420 are different from each other, the processor 150 may control the projection part 110 and the communication interface 130 to control the size of at least one of the first test projection image 1410 or the second test projection image 1420. For example, the processor 150 may control the projection part 110 to perform a zoom function to change the size of the first test projection image 1410. Further, the processor 150 may control the communication interface 130 to transmit, to the external device 200, a control instruction for performing the zoom function to change the size of the second test projection image 1420.

According to an embodiment, in case that the size of the first test projection image and the size of the second test projection image are different from each other, the processor 150 may provide one image as illustrated in FIG. 14 by using the first test projection image and the second test projection image that are different in size and subjected to keystone correction without controlling the sizes of the first test projection image and the second test projection image to be the same.

Figure 15A:
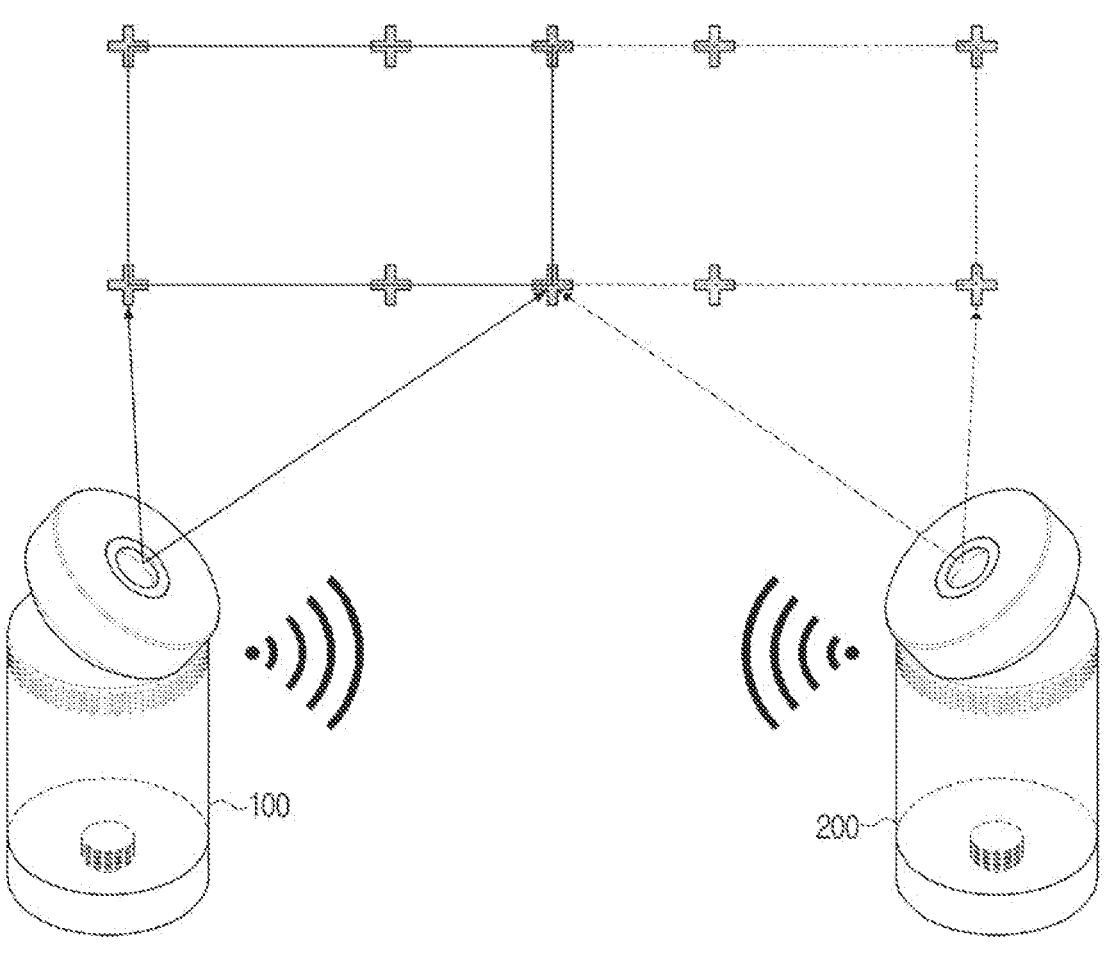
FIG. 15A is a diagram for describing an embodiment in which various audios are provided according to distance information.
Figure 15B:
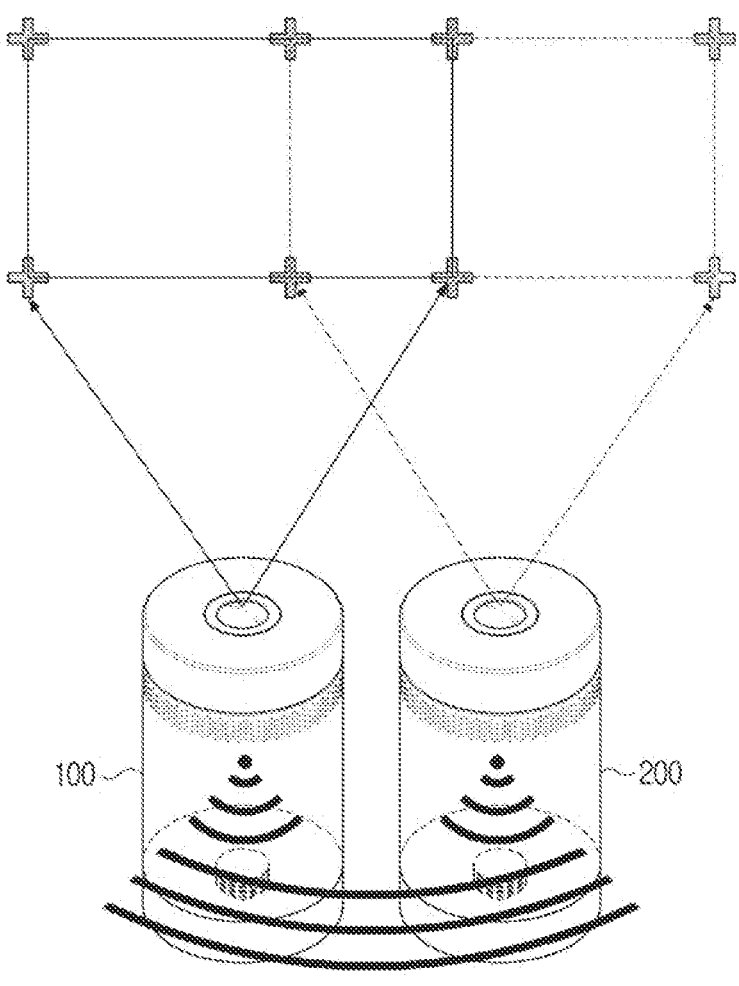
FIG. 15B is a diagram for describing an embodiment in which various audios are provided according to the distance information.
Figure 15C:
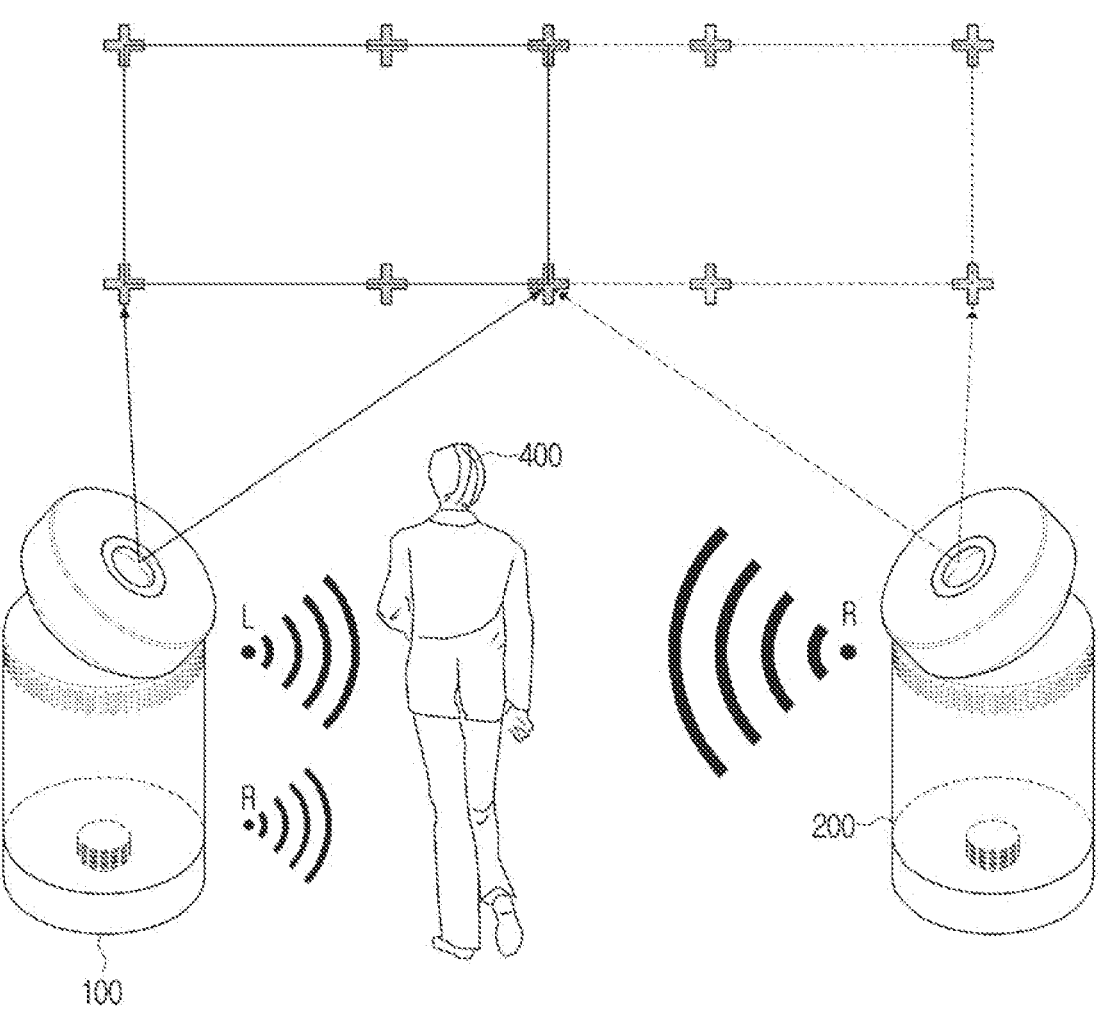
FIG. 15C is a diagram for describing an embodiment in which various audios are provided according to the distance information and a position of a user.
Figure 15D:
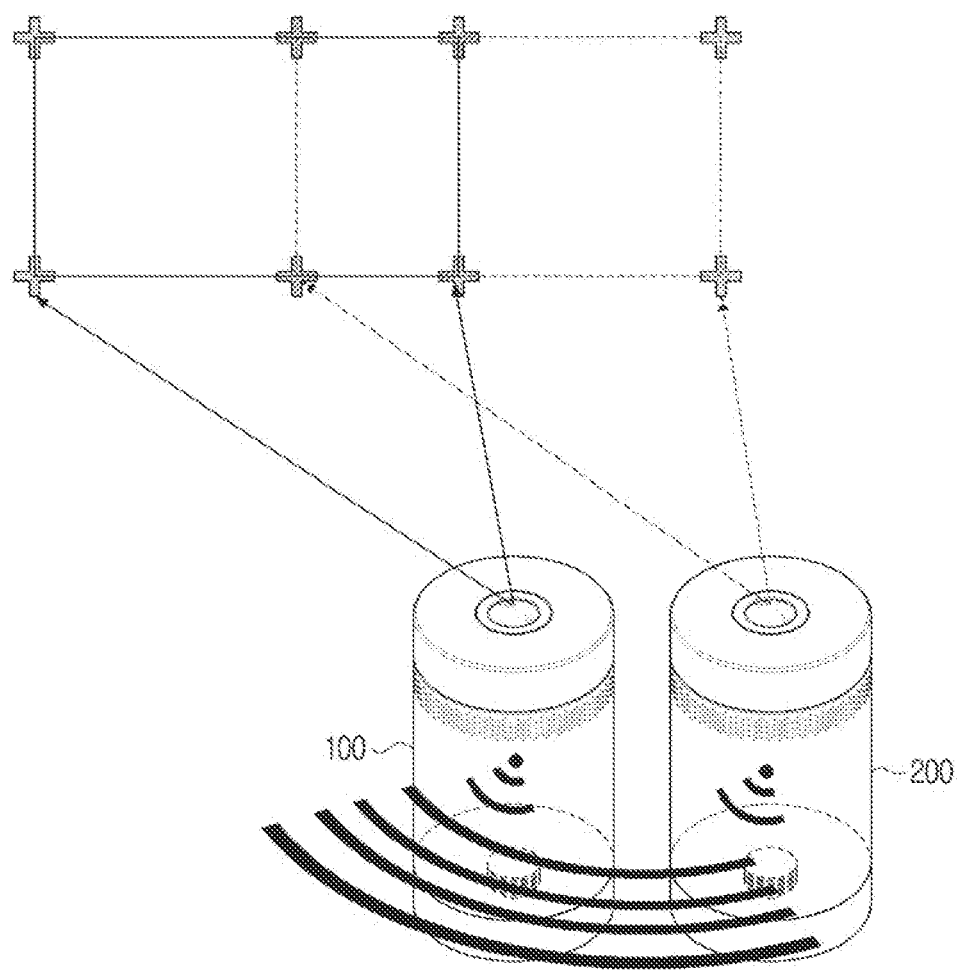
FIG. 15D is a diagram for describing an embodiment in which various audios are provided according to a position of the projection image and a relative distance of the electronic device.

FIG. 15A is a diagram for describing an embodiment in which various audios are provided according to distance information. FIG. 15B is a diagram for describing an embodiment in which various audios are provided according to the distance information. FIG. 15C is a diagram for describing an embodiment in which various audios are provided according to the distance information and a position of the user. FIG. 15D is a diagram for describing an embodiment in which various audios are provided according to a position of the projection image and a relative distance of the electronic device.

That is, the processor 150 may identify distance information to the external device 200 based on the number and positions of markers of the third color included in the captured image obtained by capturing the first test projection image 10 and the second test projection image 20.

For example, referring to FIG. 15A, in case that the number of markers of the third color included in the captured image is equal to or greater than a predetermined ratio (for example, 70%) with respect to the number of markers of the first color and the number of markers of the second color included in the captured image, the processor 150 may identify that the distance between the external device 200 and the electronic device 100 is relatively small.

For example, referring to FIG. 15B, in case that the number of markers of the third color included in the captured image is less than a predetermined ratio (for example, less than 30%) with respect to the number of markers of the first color and the number of markers of the second color included in the captured image, the processor 150 may identify that the distance between the external device 200 and the electronic device 100 is relatively large.

However, the disclosure is not limited to the above-described embodiment, and the electronic device 100 may identify a volume of a sound output from the external device 200, thereby identifying the distance information to the external device 200. That is, in case that the electronic device 100 includes a microphone, once a test sound is output from the external device 200, the processor 150 may identify a volume of the test sound output from the external device 200 through the microphone. Then, in case that the identified volume of the test sound is relatively large, the processor 150 may identify that the distance between external device 200 and the electronic device 100 is relatively small. On the other hand, in case that the identified volume of the test sound is relatively small, the processor 150 may identify that the distance between external device 200 and the electronic device 100 is relatively large.

The disclosure is not limited to the above-described embodiment, and the electronic device 100 may identify a brightness of the projection image projected on the projection region by the external device 200, thereby identifying the distance information to the external device 200. According to an embodiment, the processor 150 may capture the projection image projected by the external device 200 through the camera 140, and identify the brightness of the projection image projected on the projection region by the external device 200 through the captured image. According to an embodiment, in case that the electronic device 100 includes a luminance sensor that detects a light intensity, the processor 150 may identify the brightness of the projection image projected by the external device 200 by using the luminance sensor. Then, in case that the identified brightness is relatively high, the processor 150 may identify that the distance between external device 200 and the electronic device 100 is relatively small. On the other than, in case that the identified brightness is relatively low, the processor 150 may identify that the distance between external device 200 and the electronic device 100 is relatively large.

That is, as described above, the processor 150 may identify the distance information to the external device 200 by using at least one of the marker of the third color identified in the captured image, the volume of the test sound output from the external device 200, or the brightness of the projection image projected on the projection region by the external device 200.

Further, in case that it is identified that the distance between the external device 200 and the electronic device 100 is equal to or larger than a predetermined distance (for example, 3 m or more) based on the distance information, the processor 150 may perform a control to output the first audio, and may control the communication interface 130 to transmit, to the external device 200, a control instruction for controlling the external device 200 to output the second audio as illustrated in FIG. 15A. In case that the distance between the external device 200 and the electronic device 100 is relatively large, the electronic device 100 may control a device positioned on the left of the user to output audio having a left component, and may control a device positioned on the right of the user to output audio having a right component, thereby providing stereophonic audio.

Further, in case that it is identified that the distance between the external device and the electronic device is smaller than the predetermined distance (for example, less than 3 m) based on the distance information, the processor 150 may perform a control to output the third audio, and may control the communication interface 130 to transmit, to the external device 200, a control instruction for controlling the external device 200 to output the third audio. That is, in case that the distance between the external device 200 and the electronic device 100 is relatively small, the electronic device 100 may perform a control to make the electronic device 100 and the external device 200 output the same audio.

FIG. 15C is a diagram for describing an embodiment in which various audios are provided according to the distance information and the position of the user.

The electronic device 100 and the external device 200 may provide audio by using position information of a user 400 in addition to the distance information between the electronic device 100 and the external device 200.

According to an embodiment, the processor 150 of the electronic device 100 may obtain the position information of the user 400. For example, in case that the user 400 possesses an external display device 300, the processor 150 may obtain the position information of the user 400 based on distance information between the external display device 300 and the electronic device 100, and distance information between the external display device 300 and the external device 200. For example, the processor 150 may obtain the position information of the user 400 based on a position of the user 400 included in an image obtained using the camera 140. For example, in case that the electronic device 100 includes a microphone, once a voice of the user 400 is received through the microphone, the processor 150 of the electronic device 100 may obtain the position information of the user 400 based on a volume of the voice of the user 400. An embodiment in which the position information of the user 400 is not limited to the above-described example, and the position information of the user 400 may be obtained by various methods.

Once the position information of the user 400 is obtained, the processor 150 may provide audio by using the distance information between the electronic device 100 and the external device 200, and the position information of the user 400. For example, in case that it is identified that the position of the user 400 is closer to the electronic device 100 than to the external device 200 based on the position information of the user 400 as illustrated in FIG. 15C, the processor 150 may control the communication interface 130 to transmit, to the external device 200, a control instruction for outputting the audio having the left component. Then, the processor 150 may perform a control to make the electronic device 100 output audio having the left component and the right component. In this case, the processor 150 may perform a control to make a volume of the audio having the right component output from the electronic device 100 larger than a volume of the audio having the left component output from the electronic device 100.

That is, the electronic device 100 and the external device 200 may each output audio whose ratio between the volume of the audio having the left component and the volume of the audio having the right component is adjusted based on the position information of the user, thereby providing stereophonic audio.

FIG. 15D is a diagram for describing an embodiment in which various audios are provided according to a position of the projection image and a relative distance of the electronic device.

According to an embodiment, once the overlapping region between the first test projection image and the second test projection image is identified, and the adjustment is completed, the processor 150 of the electronic device 100 may identify relative positions of the projection regions of the electronic device 100 and the external device 200 based on the identified overlapping region, the marker of the first color, the marker of the second color, and the marker of the third color. Then, the processor 150 may perform a control to make each of the electronic device 100 and the external device 200 output audio whose ratio between the volume of the audio having the left component and the volume of the audio having the right component is adjusted according to the identified relative positions.

According to an embodiment, in case that the electronic device 100 and the external device 200 are positioned on the right sides of the projection regions as illustrated in FIG. 15D, the processor 150 may perform a control to make the electronic device 100 and the external device 200 output audio whose ratio between the audio having the left component and the audio having the right component is adjusted, thereby delivering stereophonic audio from the left based on the positions of the electronic device 100 and the external device 200.

Figure 16:
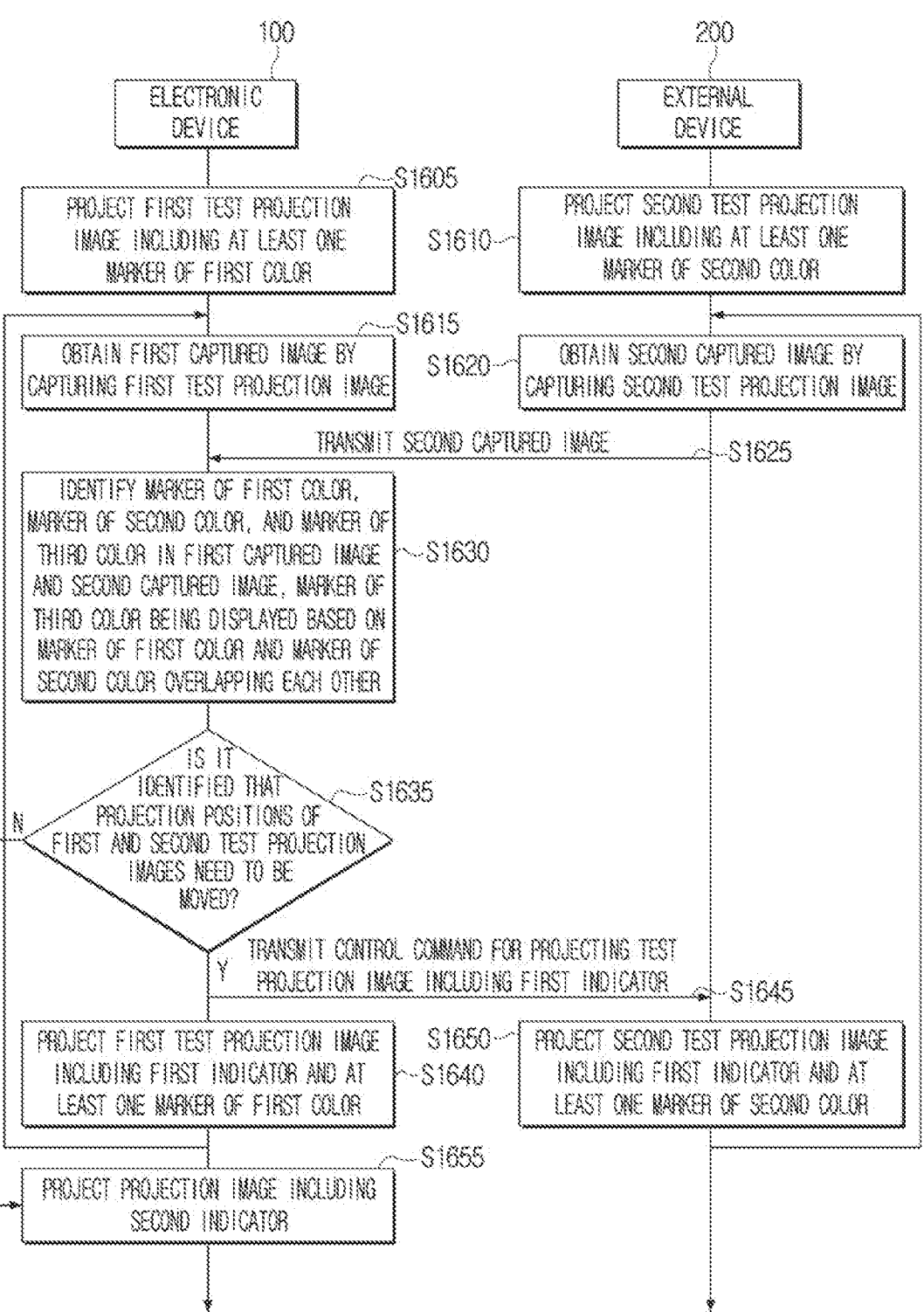
FIG. 16 is a sequence diagram for describing operations of the electronic device and the external device according to an embodiment of the disclosure.

FIG. 16 is a sequence diagram for describing operations of the electronic device 100 and the external device 200 according to the disclosure.

According to an embodiment, the test projection images may overlap each other according to the overlapping operation in a manner in which the regions on which the test projection images are projected by the electronic device 100 and the external device 200 are manually adjusted by the user. Specifically, the test projection images may overlap each other according to the overlapping operation by additionally displaying, in the test projection images, the first indicator for guiding movement of the test projection images according to the overlapping operation.

Specifically, referring to FIG. 16, the electronic device 100 may project the first test projection image including at least one marker of the first color (S1605). Then, the external device 200 may project the second test projection image including at least one marker of the second color (S1610).

The processes of S1605 and S1610 may be performed in a case that coupling between the electronic device 100 and the external device 200 is established. However, embodiments of the disclosure are not limited thereto. For example, in case that the electronic device 100 receives a user instruction for starting the overlapping operation in a state in which the coupling between the electronic device 100 and the external device 200 is established, the processes of S1605 and S1610 may be performed.

Once the first test projection image is projected, the electronic device 100 may obtain a first captured image by capturing the first test projection image (S1615). Once the second test projection image is projected, the external device 200 may obtain a second captured image by capturing the second test projection image (S1620). For example, the first captured image may be obtained through a camera attached to the electronic device 100, and the second captured image may be obtained through a camera attached to the external device 200. However, embodiments of the disclosure are not limited thereto, and the captured images may also be obtained through an external camera.

Once the second captured image is obtained, the external device 200 may transmit the second captured image to the electronic device 100 (S1625).

Once the electronic device 100 receives the second captured image, the electronic device 100 may identify at least one of (i) the marker of the third color or (ii) the marker of the first color and the marker of the second color, in the first captured image and the second captured image, the marker of the third color being displayed based on the marker of the first color and the marker of the second color overlapping each other (S1630). Although FIG. 16 illustrates a case that the markers are identified by using both of the first captured image and the second captured image, embodiments of the disclosure are not limited thereto. The markers may be identified by using one or both of the first captured image or the second captured image.

The electronic device 100 may identify whether or not the projection positions of the first and second test projection images need to be moved (S1635). That is, the electronic device 100 may identify whether or not the first test projection image and the second test projection image overlap each other according to the overlapping operation based on the marker of the first color, the marker of the second color, and the number and overlapping degree of the markers of the third color identified in the first captured image and the second captured image. In case that it is identified that the first test projection image and the second test projection image do not overlap each other according to the overlapping operation (e.g., the third marker of the third color does not exist in the first captured image and the second captured image), the processor 150 may identify that the projection positions of the first and second test projection images need to be moved.

In case that it is identified that the projection positions of the first and second test projection images need to be moved (S1635—Y), the electronic device 100 may project the first test projection image including the first indicator and at least one marker of the first color (S1640). In case that it is identified that the projection position of at least one of the first test projection image or the second test projection image needs to be moved (S1635—Y), the electronic device 100 may transmit, to the external device 200, a control instruction for projecting a test projection image including the first indicator (S1645). The first indicator may be an indicator indicating a direction for changing the projection region of the test projection region. However, embodiments of the disclosure are not limited thereto, and the first indicator may include a text for changing the projection region.

Once the external device 200 receives the control instruction from the electronic device 100 according to the process of S1645, the external device 200 may project the second test projection image including the first indicator and at least one marker of the second color (S1650).

Once the process of S1645 is performed, the electronic device 100 may perform the process of S1615 again. Further, once the process of S1650 is performed, the external device 200 may perform the process of S1620 again.

In case that it is identified that the projection positions of the first and second test projection images do not need be moved (S1635—N), the electronic device 100 may project a projection image including the second indicator (S1655). The second indicator may be an indicator indicating that the first test projection image and the second test projection image overlap each other according to the overlapping operation.

Further, the electronic device 100 may project a projection image on the adjusted projection region. Further, the electronic device 100 may transmit, to the external device 200, a control instruction for projecting a projection image on the adjusted projection region, and the external device 200 may project the projection image according to the received control instruction.

Figure 17:
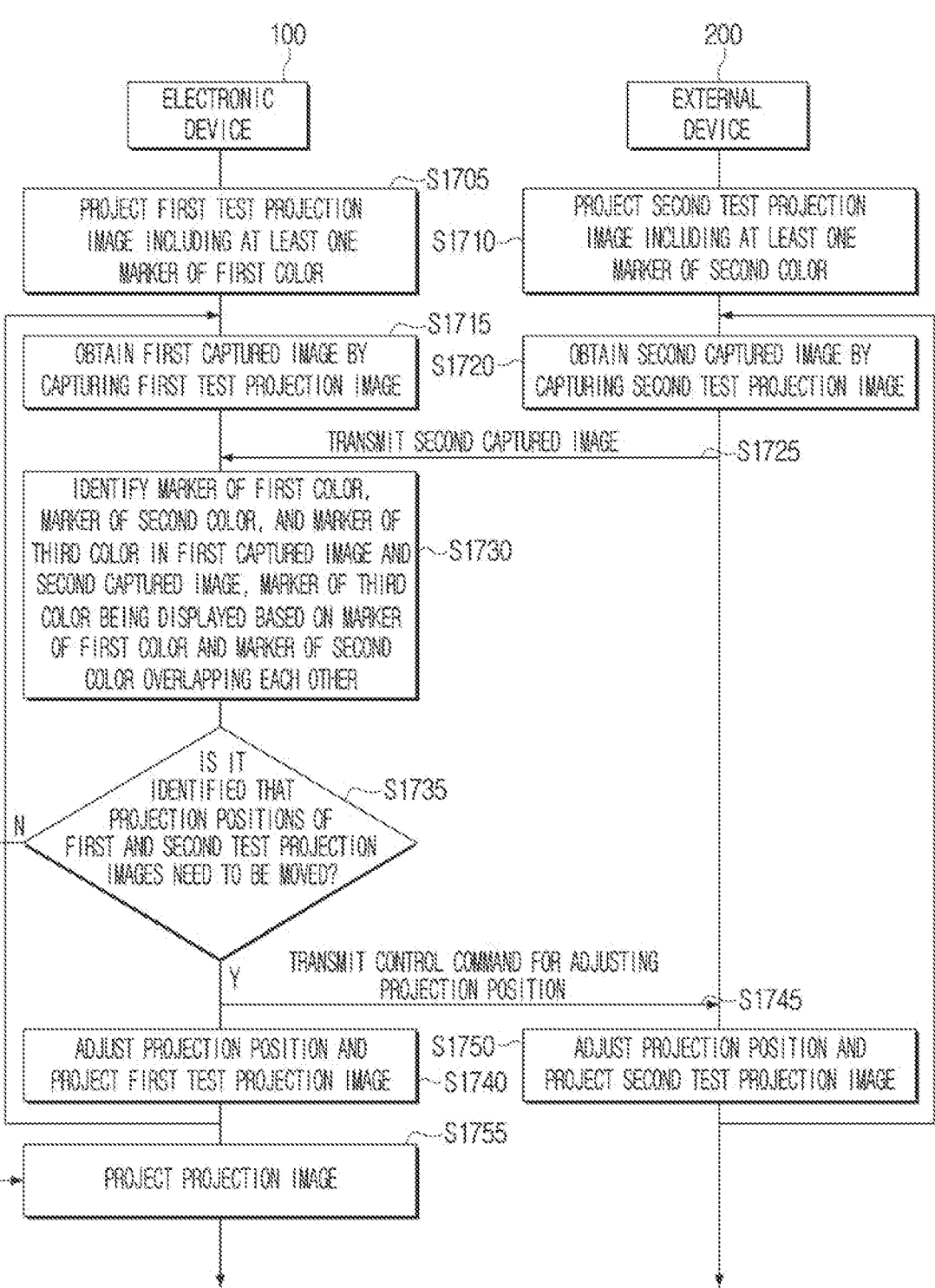
FIG. 17 is a sequence diagram for describing operations of the electronic device and the external device.

FIG. 17 is a sequence diagram for describing operations of the electronic device 100 and the external device 200.

According to an embodiment, the test projection images may overlap each other according to the overlapping operation in a manner in which the regions on which the test projection images are projected by the electronic device 100 and the external device 200 are automatically adjusted.

Specifically, referring to FIG. 17, the electronic device 100 may project the first test projection image including at least one marker of the first color (S1705). Then, the external device 200 may project the second test projection image including at least one marker of the second color (S1710). The processes of S1705 and S1710 may be performed in case that coupling between the electronic device 100 and the external device 200 is established. However, embodiments of the disclosure are not limited thereto. For example, in case that the electronic device 100 receives a user instruction for starting the overlapping operation in a state in which the coupling between the electronic device 100 and the external device 200 is established, the processes of S1705 and S1710 may be performed.

Once the first test projection image is projected, the electronic device 100 may obtain a first captured image by capturing the first test projection image (S1715). Once the second test projection image is projected, the external device 200 may obtain a second captured image by capturing the second test projection image (S1720). For example, the first captured image may be obtained through a camera attached to the electronic device 100, and the second captured image may be obtained through a camera attached to the external device 200. However, embodiments of the disclosure are not limited thereto, and the captured images may also be obtained through an external camera.

Once the second captured image is obtained, the external device 200 may transmit the second captured image to the electronic device 100 (S1725).

Once the electronic device 100 receives the second captured image, the electronic device 100 may identify at least one of (i) the marker of the third color and (ii) the marker of the first color and the marker of the second color, in the first captured image and the second captured image, the marker of the third color being displayed based on the marker of the first color and the marker of the second color overlapping each other (S1730). Although FIG. 17 illustrates a case that the markers are identified by using both of the first captured image and the second captured image, embodiments of the disclosure are not limited thereto. The markers may be identified by using at least one of the first captured image or the second captured image.

The electronic device 100 may identify whether or not the projection positions of the first and second test projection images need to be moved (S1735). That is, the electronic device 100 may identify whether or not the first test projection image and the second test projection image overlap each other according to the overlapping operation based on the marker of the first color, the marker of the second color, and the number and overlapping degree of the markers of the third color identified in the first captured image and the second captured image. In case that it is identified that the first test projection image and the second test projection image do not overlap each other according to the overlapping operation, the processor 150 may identify that the projection positions of at least one of the first test projection image or the second test projection image needs to be moved.

In case that it is identified that the projection positions of the first and second test projection images need to be moved (S1735—Y), the electronic device 100 may transmit, to the external device 200, a control instruction for adjusting the projection position (S1745). Then, the external device 200 may adjust the projection position and project the second test projection image (S1750). For example, the projection position of the projection image projected by the external device 200 may be adjusted under the control of a processor of the external device 200.

In case that it is identified that the projection positions of the first and second test projection images need to be moved (S1735—Y), the electronic device 100 may adjust the projection position and project the first test projection image (S1740).

Once the process of S1740 is performed, the electronic device 100 may perform the process of S1715 again. Further, once the process of S1750 is performed, the external device 200 may perform the process of S1720 again.

In case that it is identified that the projection positions of the first and second test projection images do not need be moved (S1735—N), the electronic device 100 may project the projection image (S1755). That is, in case that it is identified that the projection positions of the first and second test projection images need not be moved (S1735—N), the electronic device 100 may project the projection image without adjusting the projection position. In addition, the electronic device 100 may transmit, to the external device 200, a control instruction for projecting the projection image. The external device 200 may project the projection image without adjusting the projection position according to the received control instruction.

Figure 18:
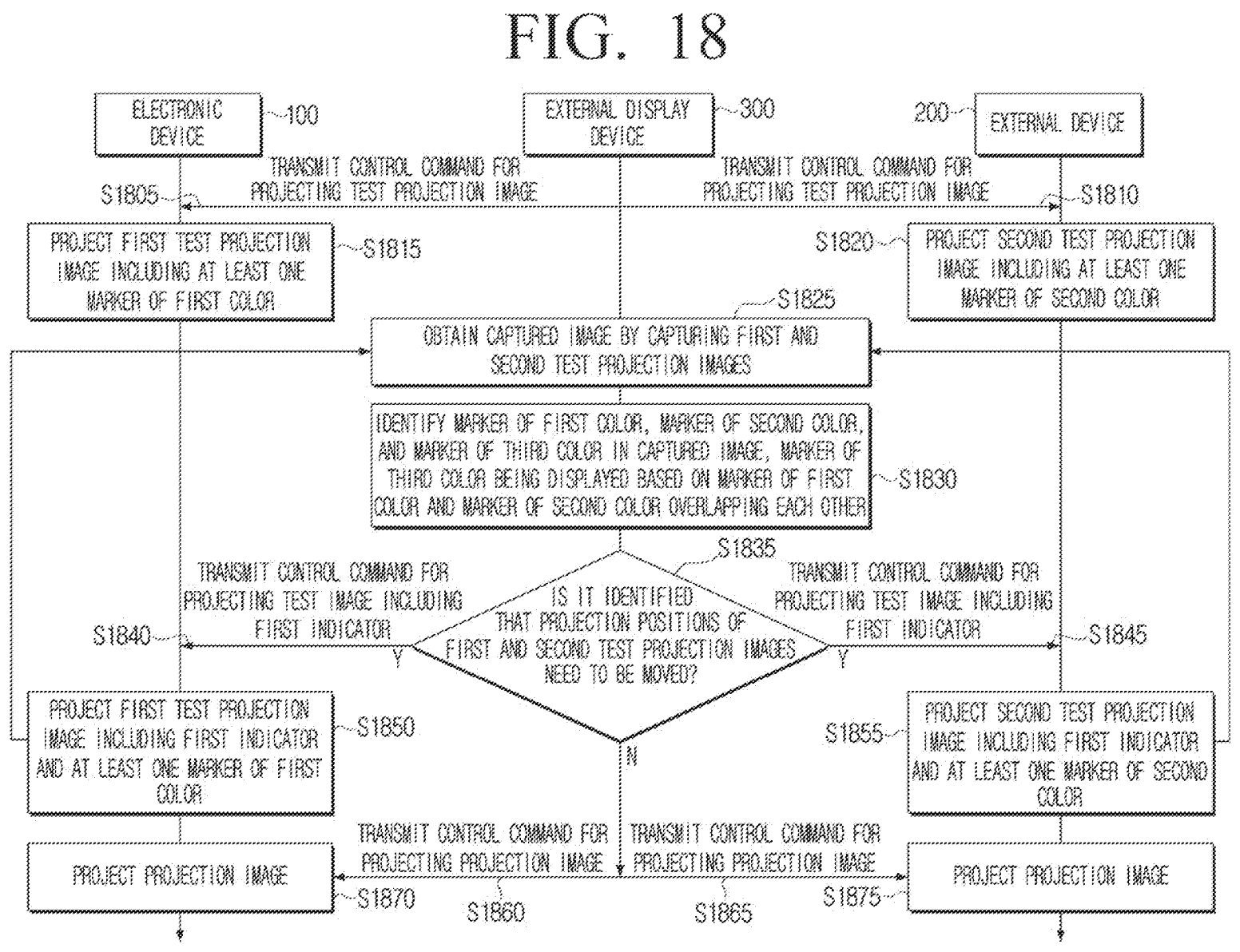

FIG. 18 is a sequence diagram for describing an embodiment in which an external display device controls the electronic device and the external device.

Although a case that the overlapping operation is provided in a manner in which the electronic device 100 controls the external device 200, embodiments of the disclosure are not limited thereto.

Specifically, referring to FIG. 18, the external display device 300 may transmit, to the electronic device 100, a control instruction for projecting the test projection image (S1805). Then, the external display device 300 may transmit, to the external device 200, a control instruction for projecting the test projection image (S1810). According to an embodiment, the external display device 300 may be implemented by a portable terminal such as a smartphone. According to an embodiment, once the external display device 300 receives a user instruction for starting the overlapping operation, the external display device 300 may perform the process of S1805 and the process of S1810.

Once the electronic device 100 receives the control instruction according to the process of S1805, the electronic device 100 may project the first test projection image including at least one marker of the first color (S1815). Once the external device 200 receives the control instruction according to the process of S1810, the external device 200 may project the second test projection image including at least one marker of the second color (S1820).

Once the first test projection image and the second test projection image are projected, the external display device 300 may obtain a captured image by capturing the first and second test projection images (S1825).

According to an embodiment, the captured image may be obtained through a camera included in the external display device 300, and in this case, a guide UI for obtaining the captured image may be displayed on a display of the external display device 300. However, embodiments of the disclosure are not limited thereto, and the external display device 300 may obtain the captured image through an external camera.

Once the captured image is obtained, the external display device 300 may identify at least one of (i) the marker of the third color and (ii) the marker of the first color and the marker of the second color, in the captured image, the marker of the third color being displayed based on the marker of the first color and the marker of the second color overlapping each other (S1830).

The external display device 300 may identify whether or not the projection positions of the first and second test projection images need to be moved (S1835). That is, the external display device 300 may identify whether or not the first test projection image and the second test projection image overlap each other according to the overlapping operation based on the marker of the first color, the marker of the second color, and the number and overlapping degree of the markers of the third color identified in the captured image. In case that it is identified that the first test projection image and the second test projection image do not overlap each other according to the overlapping operation, the external display device 300 may identify that the projection positions of the first and second test projection images need to be moved.

In case that it is identified that the projection positions of the first and second test projection images need to be moved (S1835—Y), the external display device 300 may transmit, to the electronic device 100, a control instruction for projecting the test projection image including the first indicator (S1840). In case that it is identified that the projection positions of the first and second test projection images need to be moved (S1835—Y), the external display device 300 may transmit, to the external device 200, a control instruction for projecting the test projection image including the first indicator (S1845).

Once the electronic device 100 receives the control instruction according to the process of S1840, the electronic device 100 may project the first test projection image including the first indicator and at least one marker of the first color (S1850).

Once the external device 200 receives the control instruction according to the process of S1845, the external device 200 may project the second test projection image including the first indicator and at least one marker of the second color (S1855).

Once the processes of S1850 and S1855 are performed, the external display device 300 may perform the process of S1825 again.

In case that it is identified that the projection positions of the first and second test projection images need not be moved (S1835—N), the external display device 300 may transmit, to the electronic device 100, a control instruction for projecting the projection image (S1860), and may transmit, to the external device 200, a control instruction for projecting the projection image (S1865).

Then, once the electronic device 100 receives the control instruction according to the process of S1860, the electronic device 100 may project the projection image (S1870). Then, once the external device 200 receives the control instruction according to the process of S1865, the external device 200 may project the projection image (S1875).

Although FIG. 18 illustrates an embodiment in which the external display device 300 transmits a control instruction for projecting the test projection image including the first indicator to each of the electronic device 100 and the external device 200, embodiments of the disclosure are not limited thereto. That is, in case that it is identified that the projection positions of the first and second test projection images need to be moved (S1835—Y) as illustrated in FIG. 17, the external display device 300 may transmit, to each of the electronic device 100 and the external device 200, a control instruction for adjusting the projection position.

Figure 19:
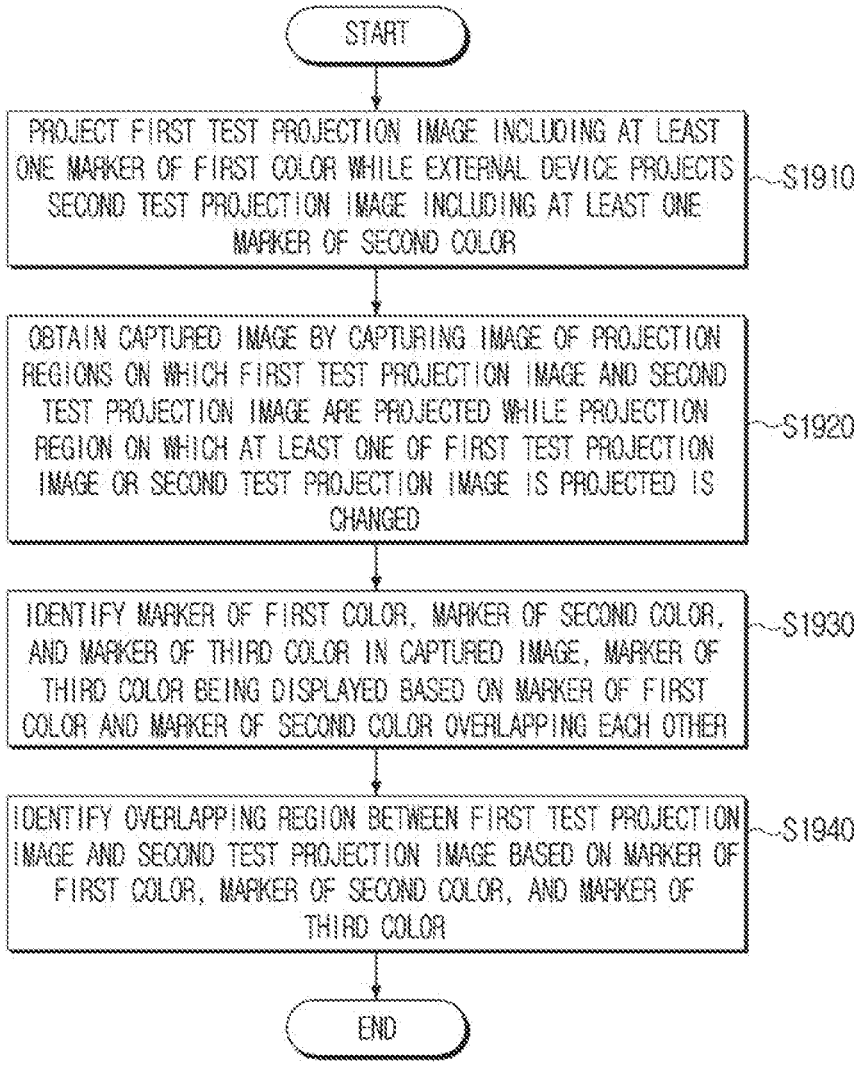
FIG. 19 is a flowchart for describing a control method of the electronic device according to an embodiment of the disclosure.

FIG. 19 is a flowchart for describing a control method of the electronic device according to the disclosure.

Referring to FIG. 19, the electronic device 100 may project the first test projection image including at least one marker of the first color while the external device 200 projects the second test projection image including at least one marker of the second color (S1910). For example, the marker of the first color may be positioned at a corner of the first test projection image, but is not limited thereto. The marker of the first color may be positioned at various positions according to each of the plurality of overlapping operations.

The electronic device 100 may obtain a captured image by capturing an image of projection regions on which the first test projection image and the second test projection image are projected while the projection region on which at least one of the first test projection image or the second test projection image is projected is changed. (S1920).

Then, the electronic device 100 may identify at least one of (i) the marker of the third color and (ii) the marker of the first color and the marker of the second color, in the captured image, the marker of the third color being displayed based on the marker of the first color and the marker of the second color overlapping each other (S1930). Here, the third color may be a color corresponding to a combination of first color light and second color light.

The electronic device 100 may identify the overlapping region between the first and second test projection images based on the identification result. That is, the electronic device 100 may identify the overlapping region between the first test projection image and the second test projection image based on the marker of the first color, the marker of the second color, and the marker of the third color (S1940). For example, it is possible to identify whether or not the first test projection image and the second test projection image overlap each other according to the overlapping operation based on the number of markers of the third color and the overlapping degree of the marker of the third color.

That is, the electronic device 100 may identify the marker of the first color included in the first test projection image, the marker of the second color included in the second test projection image, and the marker of the third color in the captured image to change the projection position of the first test projection image, or may transmit, to the external device, a control instruction for changing the projection position of the second test projection image (S1940).

That is, the processes of S1920 to S1940 may be repeated until the first test projection image and the second test projection image overlap each other according to the overlapping operation.

Figure 20:
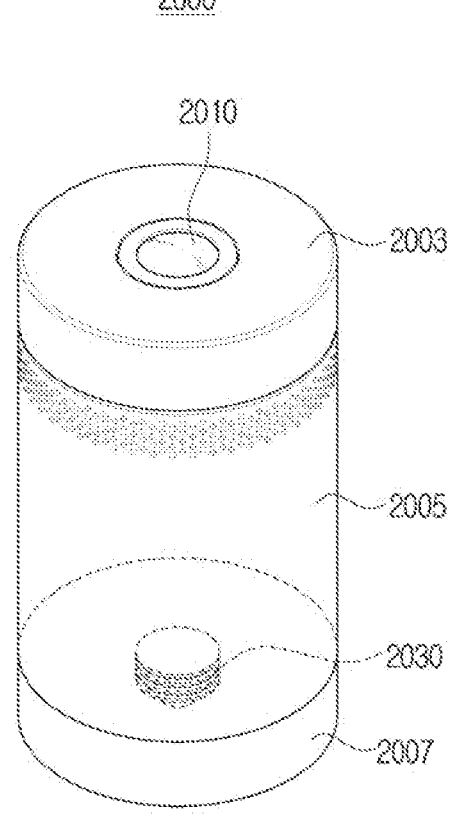
FIG. 20 is a perspective view illustrating an exterior of an electronic device according to an embodiment of the disclosure.

FIG. 20 is a perspective view illustrating an exterior of an electronic device 2000 according to an embodiment of the disclosure.

Referring to FIG. 20, the electronic device 2000 may include a head 2003, a main body 2005, a projection lens 2010, a connector 2030, or a cover 2007.

The electronic device 2000 may be devices in various forms. In particular, the electronic device 2000 may be a projector device that enlarges and projects an image to a wall or a screen, and the projector device may be an LCD projector or a digital light processing (DLP) type projector that uses a digital micromirror device (DMD).

Also, the electronic device 2000 may be a display device for households or for an industrial use. Alternatively, the electronic device 2000 may be an illumination device used in everyday lives, or an audio device including an audio module, and it may be implemented as a portable communication device (e.g.: a smartphone), a computer device, a portable multimedia device, a wearable device, or a home appliance, etc. The electronic device 2000 according to an embodiment of the disclosure is not limited to the aforementioned devices, and the electronic device 2000 may be implemented as an electronic device 2000 equipped with two or more functions of the aforementioned devices. For example, according to a manipulation of a processor, a projector function of the electronic device 2000 is turned off, and an illumination function or a speaker function is turned on, and the electronic device 2000 may be utilized as a display device, an illumination device, or an audio device. Also, the electronic device 2000 may include a microphone or a communication device, and may be utilized as an AI speaker.

The main body 2005 is a housing constituting the exterior, and it may support or protect the components of the electronic device 2000 (e.g., the components illustrated in FIG. 21) that are arranged inside the main body 2005. The shape of the main body 2005 may have a structure close to a cylindrical shape as illustrated in FIG. 20. However, the shape of the main body 2005 is not limited thereto, and according to the various embodiments of the disclosure, the main body 2005 may be implemented as various geometrical shapes such as a column, a cone, a sphere, etc. having polygonal cross sections.

The size of the main body 2005 may be a size that a user can grip or move with one hand, and the main body 2005 may be implemented as a micro size so as to be easily carried, or it may be implemented as a size that can be held on a table or that can be coupled to an illumination device.

Also, the material of the main body 2005 may be implemented as a matt metallic or synthetic resin such that a user's fingerprint or dust does not smear it. Alternatively, the exterior of the main body 2005 may consist of a slick glossy material.

In the main body 2005, a friction area may be formed in a partial area of the exterior of the main body 2005 such that a user can grip and move the main body 2005. Alternatively, in the main body 2005, a bent gripping part or a support 2008*a* (refer to FIG. 22) that can be gripped by a user may be provided in at least a partial area.

The projection lens 2010 is formed on one surface of the main body 2005, and is formed to project a light that passed through a lens array to the outside of the main body 2005. The projection lens 2010 according to the various embodiments of the disclosure may be an optical lens which was low-dispersion coated for reducing chromatic aberration. Also, the projection lens 2010 may be a convex lens or a condensing lens, and the projection lens 2010 according to an embodiment of the disclosure may adjust the focus by adjusting locations of a plurality of sub lenses.

The head 2003 may be provided to be coupled to one surface of the main body 2005, and it can support and protect the projection lens 2010. Also, the head 2003 may be coupled to the main body 2005 so as to be swiveled within a predetermined angle range based on one surface of the main body 2005.

The head 2003 may be automatically or manually swiveled by a user or the processor, and it may freely adjust a projection angle of the projection lens 2010. Alternatively, the head 2003 may include a neck that is coupled to the main body 2005 and that extends from the main body 2005, and the head 2003 may adjust a projection angle of the projection lens 2010 as it is tipped or tilted.

The electronic device 2000 may project a light or an image to a desired location by adjusting an emission angle of the projection lens 2010 while adjusting the direction of the head 2003 in a state wherein the location and the angle of the main body 2005 are fixed. Also, the head 2003 may include a handle that a user can grip after rotating in a desired direction.

On an outer circumferential surface of the main body 2005, a plurality of openings may be formed. Through the plurality of openings, audio output from an audio output part may be output to the outside of the main body 2005 of the electronic device 2000. The audio output part may include a speaker, and the speaker may be used for general uses such as reproduction of multimedia or reproduction of recording, output of a voice, etc.

According to an embodiment of the disclosure, a radiation fan may be provided inside the main body 2005, and when the radiation fan is operated, air or heat inside the main body 2005 may be discharged through the plurality of openings. Accordingly, the electronic device 2000 may discharge heat generated by the driving of the electronic device 2000 to the outside, and prevent overheating of the electronic device 2000.

The connector 2030 may connect the electronic device 2000 with an external device and transmit or receive electronic signals, or it may be supplied with power from the outside. The connector 2030 according to an embodiment of the disclosure may be physically connected with an external device. Here, the connector 2030 may include an input/output interface, and it may connect communication with an external device, or it may be supplied with power via wire or wirelessly. For example, the connector 2030 may include an HDMI connection terminal, a USB connection terminal, an SD card accommodating groove, an audio connection terminal, or a power socket. Alternatively, the connector 2030 may include a Bluetooth, Wi-Fi, or wireless charge connection module that is connected with an external device wirelessly.

Also, the connector 2030 may have a socket structure connected to an external illumination device, and it may be connected to a socket accommodating groove of an external illumination device and supplied with power. The size and specification of the connector 2030 of a socket structure may be implemented in various ways in consideration of an accommodating structure of an external device that can be coupled. For example, according to the international standard E26, a diameter of a joining part of the connector 2030 may be implemented as 26 mm, and in this case, the electronic device 2000 may be coupled to an external illumination device such as a stand in place of a light bulb that is generally used. When coupled to a conventional socket located on a ceiling, the electronic device 2000 has a structure of being projected from up to down, and in case the electronic device 2000 does not rotate by socket-coupling, the screen cannot be rotated, either. Accordingly, in case power is supplied as the electronic device 2000 is socket-coupled, in order that the electronic device 2000 can rotate, the head 2003 is swiveled on one surface of the main body 2005 and adjusts an emission angle while the electronic device 2000 is socket-coupled to a stand on a ceiling, and accordingly, the screen can be emitted to a desired location, or the screen can be rotated.

The connector 2030 may include a coupling sensor, and the coupling sensor may sense whether the connector 2030 and an external device are coupled, a coupled state, or a subject for coupling, etc. and transmit the information to the processor, and the processor may control the driving of the electronic device 2000 based on the transmitted detection values.

The cover 2007 may be coupled to or separated from the main body 2005, and it may protect the connector 2030 such that the connector 2030 is not exposed to the outside at all times. The shape of the cover 2007 may be a shape of being continued to the main body 2005 as illustrated in FIG. 20. Alternatively, the shape may be implemented to correspond to the shape of the connector 2030. Also, the cover 2007 may support the electronic device 2000, and the electronic device 2000 may be coupled to the cover 2007, and may be used while being coupled to or held on an external holder.

In the electronic device 2000 according to the various embodiments of the disclosure, a battery may be provided inside the cover 2007. The battery may include, for example, a primary cell that cannot be recharged, a secondary cell that can be recharged, or a fuel cell.

Figure 21:
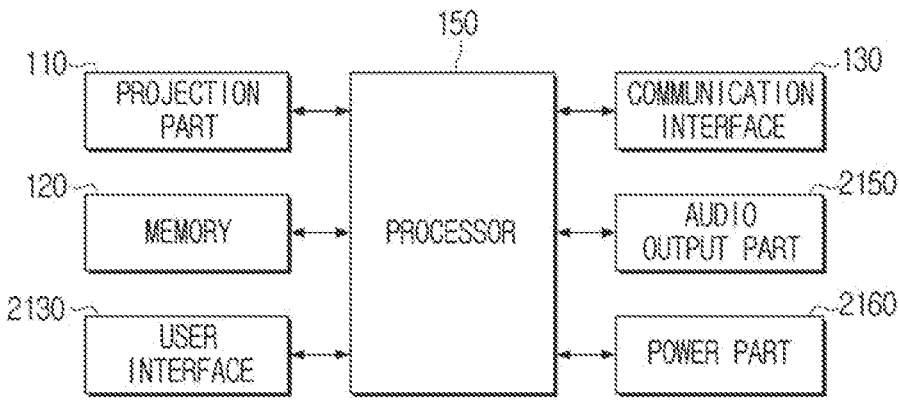
FIG. 21 is a block diagram illustrating a configuration of the electronic device according to the embodiment of the disclosure.

FIG. 21 is a block diagram illustrating components of an electronic device 2100 according to an embodiment of the disclosure. As illustrated in FIG. 21, the electronic device 2100 may include a projection part 2110, a memory 2120, a user interface 2130, a communication interface 130, an audio output part 2150, a power part 2160, and a processor 2170. The components illustrated in FIG. 21 are only an example. Some of the components may be omitted, and a new component may be added. Configurations of the memory 2120 and the processor 2170 are the same as those of the memory 120 and the processor 150, and thus, a detailed description thereof will be omitted.

The projection part 2110 is a component that projects an image to the outside. The projection part 2110 according to an embodiment of the disclosure may be implemented in various projection types (for example, a cathode-ray tube (CRT) type, an LCD type, a DLP type, and a laser type). For example, the same principle as that of a CRT monitor applies to the CTR type. In the CRT type, an image is enlarged through a lens in front of a CRT and is displayed on a screen. The CRT type is classified into a single tube type and a three tube type. In the three tube type, a red CRT, a green CRT, and a blue CRT may be separately implemented.

As another example, in the LCD type, light emitted from a light source is transmitted through a liquid crystal to display an image. The LCD type is classified into a single panel type and a three panel type. In the three panel type, light emitted from a light source may be divided into red light, green light, and blue light by a dichroic mirror (a mirror that reflects light of a specific color and transmits light of other colors), transmitted through a liquid crystal, and then collected at one point again.

As still another example, in the DLP type, an image is displayed by using a DMD chip. A projection part of the DLP type may include a light source, a color wheel, the DMD chip, a projection lens, and the like. Light emitted from the light source may have a color by passing through the rotating color wheel. The light passing through the color wheel is input to the DMD chip. The DMD chip includes a number of micromirrors, and reflects the light input thereto. The projection lens may serve to enlarge the light reflected from the DMD chip to an image size.

As still another example, the laser type includes a diode pumped solid state (DPSS) laser and a galvanometer. As a laser that outputs various colors, a laser in which three DPSS lasers are installed for RGB colors, and a special mirror is used to overlap optical axes is used. The galvanometer includes a mirror and a high-power motor to move the mirror at a high speed. For example, the galvanometer may rotate the mirror at a speed up to 40 kHz/sec. The galvanometer is mounted along a scanning direction. Generally, the projector performs flatbed scanning, and thus, the galvanometers may also be arranged along each of an x axis and a y axis.

The projection part 2110 may perform various functions for adjusting an output image under the control of the processor 2170. For example, the projection part 2110 may perform functions such as a zoom function, a keystone function, a quick corner (4-corner) keystone function, and a lens shift function.

Specifically, the projection part 2110 may enlarge or reduce an image according to a distance (projection distance) to the screen. That is, the zoon function may be performed according to the distance to the screen. Here, the zoom function may include a hardware method in which the size of the screen is adjusted by moving the lens, and a software method in which the size of the screen is adjusted by cropping the image or the like. In case that the zoom function is performed, a focal point of the image needs to be adjusted. For example, a method of adjusting the focal point includes a manual focusing method, an electric focusing method, and the like. The manual focusing method refers to a method in which focusing is manually performed, and the electric focusing method refers to a method in which the projector automatically performs focusing by using a motor embedded therein. In case that the zoom function is performed, the projection part 2110 may provide a digital zoom function using software, and may provide an optical zoom function in which the zoom function is performed by moving the lens through a driver.

Further, the projection part 2110 may perform the keystone function. At the time of front projection, in case that a height is not appropriate, the screen may be distorted upward or downward. The keystone function refers to a function of correcting the distorted screen. For example, in case that distortion occurs in a horizontal direction of the screen, the correction may be performed by using a horizontal keystone function, and in case that distortion occurs in a vertical direction, the correction may be performed by using a vertical keystone function The quick corner (4-corner) keystone function refers to a function of correcting the screen in case that a central region of the screen is normal, and corner regions of the screen are unbalanced. The lens shift function refers to a function of moving the screen as it is at the time of screen deviation.

The projection part 2110 may provide the zoom function, the keystone function, and the focusing function by automatically analyzing the surrounding environment and a projection environment without a user input. Specifically, the projection part 2110 may automatically provide the zoom function, the keystone function, and the focusing function based on a distance between the electronic device 2100 and the screen detected by a sensor (a depth camera sensor, a distance sensor, an infrared sensor, a luminance sensor, or the like), information regarding a space where the electronic device 2100 is currently positioned, information regarding an ambient light quantity, and the like.

Further, the projection part 2110 may provide the illumination function by using the light source. Particularly, the projection part 2110 may provide the illumination function by emitting light using an LED. According to an embodiment, the projection part 2110 may include one LED, and according to another embodiment, the electronic device 2100 may include a plurality of LEDs. The projection part 2110 may emit light by using a surface emitting LED in some implementation examples. Here, the surface emitting LED may refer to an LED having a structure in which an optical sheet is disposed on an upper side of the LED to output light in a uniformly dispersed manner. Specifically, once the light is output through the LED, the light may be uniformly disposed through the optical sheet, and the light dispersed through the optical sheet may be incident on a display panel.

The projection part 2110 may provide a dimming function for adjusting an intensity of light. Specifically, once a user input for adjusting the intensity of light is input from the user through a user interface 240 (for example, a touch display button or dial), the projection part 2110 may control the LED to output light whose intensity corresponds to the received user input.

Further, the projection part 2110 may provide the dimming function based on a content analyzed by the processor 2170 without the user input. Specifically, the projection part 2110 may control the LED to output light whose intensity is based on information regarding a currently provided content (for example, a type of the content or a brightness of the content).

The projection part 2110 may control a color temperature under the control of the processor 2170. Here, the processor 2170 may control the color temperature based on a content. Specifically, in case that it is identified that the content is to be output, the processor 2170 may obtain color information of each frame of the content determined to be output. Further, the processor 2170 may control the color temperature based on the obtained color information of each frame. Here, the processor 2170 may obtain at least one main color of each frame based on the color information of each frame. Further, the processor 2170 may adjust the color temperature based on the obtained at least one main color. For example, the color temperature that is adjustable by the processor 2170 may be divided into a warm type and a cold type. Here, it is assumed that a frame to be output (hereinafter, referred to as output frame) includes a scene in which a fire occurs.

The processor 2170 may identify (or obtain) that the main color is red based on the color information included in the current output frame. Further, the processor 2170 may identify the color temperature corresponding to the identified main color (red). Here, the color temperature corresponding to red may be the warm type. The processor 2170 may use an artificial intelligence model to obtain the color temperature or main color of the frame. According to an embodiment, the artificial intelligence model may be stored in the electronic device 2100 (for example, the memory 2120). According to another embodiment, the artificial intelligence model may be stored in an external server that may perform communication with the electronic device 2100.

The electronic device 2100 may control the illumination function in cooperation with an external device. Specifically, the electronic device 2100 may receive illumination information from the external device. Herein the illumination information may include at least one of bright information or color temperature information set by the external device. Here, the external device may refer to a device connected to the same network as that of the electronic device 2100 (for example, an Internet of things (IoT) device included in the same home/company network), or a device that is not connected to the same network as that of the electronic device 2100 and may perform communication with the electronic device (for example, a remote control server). For example, it is assumed that an external illumination device (IoT device) included in the same network as that of the electronic device 2100 outputs red light at a brightness of 50. The external illumination device (IoT device) may directly or indirectly transmit the illumination information (for example, information indicating that the red light is output at a brightness of 50) to the electronic device 2100. Here, the electronic device 2100 may control output of light based on the illumination information received from the external illumination device. For example, in case that the illumination information received from the external illumination device includes the information indicating that the red light is output at a brightness of 50, the electronic device 2100 may output red light at a brightness of 50.

The electronic device 2100 may control the illumination function based on biological information. Specifically, the processor 2170 may obtain biological information of the user. Here, the biological information may include at least one of a body temperature, a heart rate, a blood pressure, respiration, or an electrocardiogram of the user. Here, the biological information may include various information other than the above-described information. For example, the electronic device 2100 may include a sensor for measuring the biological information. The processor 2170 may obtain the biological information of the user through the sensor, and control output of light based on the obtained biological information. As another example, the processor 2170 may receive the biological information from an external device through the communication interface 130. Here, the external device may refer to a portable communication device (for example, a smartphone or a wearable device) of the user. The processor 2170 may obtain the biological information of the user from the external device, and control output of light based on the obtained biological information. In some implementation examples, the electronic device may identify whether or not the user is in sleep, and in case that it is identified that the user is in sleep (or is preparing for sleep), the processor 2170 may control output of light based on the biological information of the user.

The user interface 2130 may include various types of input devices. For example, the user interface 2130 may include a physical button. Here, the physical button may include a function key, a direction key (for example, 4-direction keys), or a dial button. According to an embodiment, the physical button may be implemented by a plurality of keys. According to another embodiment, the physical button may be implemented by one key. Here, in case that the physical button is implemented by one key, the electronic device 2100 may receive a user input of pressing one key for a threshold time or longer. Once the user input of pressing one key for the threshold time or longer is received, the processor 2170 may perform a function corresponding to the user input. For example, the processor 2170 may provide the illumination function based on the user input.

Further, the user interface 2130 may receive a user input by using a non-contact method. In case that the user input is received by using a contact method, a physical force needs to be transferred to the electronic device. Therefore, a method for controlling electronic device without a physical force may be required. Specifically, the user interface 2130 may receive a user gesture, and may perform an operation corresponding to the received user gesture. Here, the user interface 2130 may receive the user gesture by using a sensor (for example, an image sensor or an infrared sensor).

Further, the user interface 2130 may receive the user input by using a touch method. For example, the user interface 2130 may receive the user input through a touch sensor. According to an embodiment, the touch method may be implemented by a non-contact method. For example, the touch sensor may identify whether or not a body of the user is within a threshold distance. Here, the touch sensor may identify the user input even in case that the user does not contact the touch sensor. According to another implementation example, the touch sensor may identify the user input of contacting, by the user, the touch sensor.

The electronic device 2100 may receive the user input by various methods other than the above-described user interface. According to an embodiment, the electronic device 2100 may receive a user input through an external remote control device. Here, the external remote control device may be a remote control device corresponding to the electronic device 2100 (for example, a control device dedicated for the electronic device), or a portable communication device of the user (for example, a smartphone or a wearable device). Here, the portable communication device of the user may store an application for controlling the electronic device. The portable communication device may obtain the user input through the stored application and transmit the obtained user input to the electronic device 2100. The electronic device 2100 may receive the user input from the portable communication device, and perform an operation corresponding to a control instruction of the user.

The electronic device 2100 may receive a user input by using speech recognition. According to an embodiment, the electronic device 2100 may receive a user speech through a microphone included in the electronic device. According to another embodiment, the electronic device 2100 may receive the user speech through a microphone or an external device. Specifically, the external device may obtain the user speech through a microphone of the external device, and transmit the obtained speech of the user to the electronic device 2100. The speech of the user transmitted from the external device may be audio data or digital data (for example, audio data converted into a frequency domain) obtained by converting the audio data. Here, the electronic device 2100 may perform an operation corresponding to the received user speech. Specifically, the electronic device 2100 may receive audio data corresponding to the user speech through the microphone. Further, the electronic device 2100 may convert the received audio data into digital data. The electronic device 2100 may convert the digital data obtained by the conversion into text data by using a speech-to-text (STT) function. According to an embodiment, the STT function may be directly performed by the electronic device 2100.

According to another embodiment, the STT function may be performed by an external server. The electronic device 2100 may transmit the digital data to the external server. The external server may convert the digital data into text data, and obtain control instruction data based on the text data obtained by the conversion. The external server may transmit, to the electronic device 2100, the control instruction data (here, the text data may also be included). The electronic device 2100 may perform an operation corresponding to the user speech based on the obtained control instruction data.

The electronic device 2100 may provide a speech recognition function by using one assistance (or an artificial intelligence secretary (for example, Bixby)). However, this is only an embodiment, and the electronic device 2100 may provide the speech recognition function by using a plurality of assistances. In this case, the electronic device 2100 may provide the speech recognition function by selecting one of the plurality of assistances based on a trigger word corresponding to the assistance or a specific key present in a remote controller.

The electronic device 2100 may receive a user input by using screen interaction. The screen interaction refers to a function in which the electronic device identifies whether or not a predetermined event occurs through an image projected on a screen (or a projection surface), and obtains a user input based on the predetermined event. Here, the predetermined event may refer to an event in which a predetermined object is identified at a specific position (for example, a position at which a UI for receiving the user input is projected). Here, the predetermined object may include at least one of a part (for example, a finger) of the body of the user, a pointer, or a laser pointer. Once the predetermined object is identified at the position corresponding to the projected UI, the electronic device 2100 may identify that the user input for selecting the projected UI is received. For example, the electronic device 2100 may project a guide image to display the UI on the screen. Then, the electronic device 2100 may identify whether or not the user selects the projected UI. Specifically, in case that the predetermined event is identified at the position of the projected UI, the electronic device 2100 may identify that the user selects the projected UI. Here, the projected UI may include at least one item. Here, the electronic device 2100 may perform spatial analysis to identify whether or not the predetermined event is identified at the position of the projected UI. Here, the electronic device 2100 may perform the spatial analysis by using a sensor (for example, an image sensor, an infrared sensor, a depth camera sensor, or a distance sensor). The electronic device 2100 may identify whether or not the predetermined event occurs at the specific position (the position at which the UI is projected) by performing the spatial analysis. Then, once it is identified that the predetermined event occurs at the specific position (the position at which the UI is projected), the electronic device 2100 may identify that the user input for selecting the UI corresponding to the specific position is received.

According to an embodiment, the communication interface 130 is a component for inputting and outputting at least one of an audio signal or an image signal. The communication interface 130 may receive at least one of an audio signal or an image signal from an external device, and may output a control instruction to the external device.

The communication interface 130 according to an embodiment of the disclosure may be implemented by at least one of wired communication interfaces including a high definition multimedia interface (HDMI), a mobile high-definition link (MHL), a universal serial bus (USB), a USB C-type, a DisplayPort (DP), a thunderbolt, a video graphics array (VGA) port, an RGB port, a D-subminiature (D-SUB), and a digital visual interface (DVI). According to an embodiment, the wired communication interface may be implemented as an interface that inputs and outputs only the audio signal and an interface that inputs and outputs only the image signal, or may be implemented as one interface that inputs and outputs both of the audio signal and the image signal.

Further, the electronic device 2100 may receive data through the wired communication interface, but this is only an embodiment. The electronic device 2100 may also receive power through the wired communication interface. For example, the electronic device 2100 may receive power from an external battery through the USB C-type, or may receive power from a socket through a power adapter. As another example, the electronic device may receive power from an external device (for example, a notebook computer or a monitor) through the DP.

The communication interface 130 according to an embodiment of the disclosure may be implemented as a wireless communication interface that performs communication by using at least one of communication methods including Wi-Fi, Wi-Fi Direct, Bluetooth, ZigBee, 3G, 3GPP, and LTE as described above with reference to FIG. 1. According to an implementation example, the wireless communication interface may be implemented as an interface that inputs and outputs only the audio signal and an interface that inputs and outputs only the image signal, or may be implemented as one interface that inputs and outputs both of the audio signal and the image signal.

Further, a configuration in which the audio signal is input through the wired communication interface, and the image signal is input through the wireless communication interface may be implemented. Alternatively, a configuration in which the audio signal is input through the wireless communication interface, and the image signal is input through the wired communication interface may be implemented.

The audio output part 2150 is a component that outputs audio signals. In particular, the audio output part 2150 may include an audio output mixer, an audio signal processor, and an audio output module. The audio output mixer may mix a plurality of audio signals to be output as at least one audio signal. For example, the audio output mixer may mix an analog audio signal and another analog audio signal (e.g.: an analog audio signal received from the outside) as at least one analog audio signal. The audio output module may include a speaker or an output terminal. According to an embodiment of the disclosure, the audio output module may include a plurality of speakers, and in this case, the audio output module may be arranged inside the main body, and audio that is emitted while covering at least a part of a vibration plate of the audio output module may be transmitted to the outside of the main body after passing through a waveguide. The audio output module may include a plurality of audio output units, and the plurality of audio output units may be symmetrically arranged on the exterior of the main body, and accordingly, audio may be emitted to all directions, i.e., all directions in 360 degrees.

The power part 2160 may be supplied with power from the outside and supply the power to various components of the electronic device 2100. The power part 2160 according to an embodiment of the disclosure may be supplied with power through various methods. As an example, the power part 2160 may be supplied with power by using the connector 2030 as illustrated in FIG. 20. Also, the power part 2160 may be supplied with power by using a DC power code of 120V. However, embodiments of the disclosure are not limited thereto, and the electronic device may be supplied with power by using a USB power code or supplied with power by using a wireless charging method.

Also, the power part 2160 may be supplied with power by using an internal battery or an external battery. The power part 2160 according to an embodiment of the disclosure may be supplied with power through an internal battery. As an example, the power part 2160 may charge power of the internal battery by using at least one of a DC power code of 120V, a USB power code, or a USB C-type power code, and may be supplied with power through the charged internal battery. Also, the power part 2160 according to an embodiment of the disclosure may be supplied with power through an external battery. As an example, if connection between the electronic device and an external battery is performed through various wired communication methods such as a USB power code, a USB C-type power code, a socket groove, etc., the power part 2160 may be supplied with power through the external battery. That is, the power part 2160 may be directly supplied with power from an external battery, or charge an internal battery through an external battery, and supplied with power from the charged internal battery.

The power part 2160 according to the disclosure may be supplied with power by using at least one of the aforementioned plurality of power supplying methods.

Regarding power consumption, the electronic device 2100 may have power consumption of equal to or smaller than a predetermined value (e.g., 43 W) for the reason of a form of a socket or other standards, etc. Here, the electronic device 2100 may vary the power consumption such that the power consumption can be reduced when using a battery. That is, the electronic device 2100 may vary the power consumption based on the power supplying method and the use amount of power, etc.

The electronic device 2100 according to an embodiment of the disclosure may provide various smart functions.

Specifically, the electronic device 2100 may be connected with a portable terminal device for controlling the electronic device 2100, and the screen output at the electronic device 2100 may be controlled through a user input that is input at the portable terminal device. As an example, the portable terminal device may be implemented as a smartphone including a touch display, and the electronic device 2100 may receive screen data provided at the portable terminal device from the portable terminal device and output the data, and the screen output at the electronic device 2100 may be controlled according to a user input that is input at the portable terminal device.

The electronic device 2100 may perform connection with the portable terminal device through various communication methods such as Miracast, Airplay, wireless DEX, a remote PC method, etc., and share contents or music provided at the portable terminal device.

Also, connection between the portable terminal device and the electronic device 2100 may be performed by various connection methods. As an example, the electronic device 2100 may be searched at the portable terminal device and wireless connection may be performed, or the portable terminal device may be searched at the electronic device 2100 and wireless connection may be performed. Then, the electronic device 2100 may output contents provided at the portable terminal device.

As an example, in a state wherein a specific content or music is being output at the portable terminal device, if the portable terminal device is located around the electronic device, and then a predetermined gesture (e.g., a motion tap view) is detected through a display of the portable terminal device, the electronic device 2100 may output the content or music that is being output at the portable terminal device.

As an example, in a state wherein a specific content or music is being output at the portable terminal device, if the portable terminal device becomes close to the electronic device 2100 by equal to or smaller than a predetermined distance (e.g., a non-contact tap view), or the portable terminal device contacts the electronic device 2100 two times at a short interval (e.g., a contact tap view), the electronic device 2100 may output the content or music that is being output at the portable terminal device.

In the aforementioned embodiment, it was described that the same screen as the screen that is being provided at the portable terminal device is provided at the electronic device 2100, but embodiments of the disclosure are not limited thereto. That is, if connection between the portable terminal device and the electronic device 2100 is constructed, a first screen provided at the portable terminal device may be output at the portable terminal device, and a second screen provided at the portable terminal device that is different from the first screen may be output at the electronic device 2100. As an example, the first screen may be a screen provided by a first application installed on the portable terminal device, and the second screen may be a screen provided by a second application installed on the portable terminal device. As an example, the first screen and the second screen may be different screens from each other that are provided by one application installed on the portable terminal device. Also, as an example, the first screen may be a screen including a UI in a remote control form for controlling the second screen.

The electronic device 2100 according to the disclosure may output a standby screen. As an example, in case connection between the electronic device 2100 and an external device was not performed or in case there is no input received from an external device during a predetermined time, the electronic device 2100 may output a standby screen. Conditions for the electronic device 2100 to output a standby screen are not limited to the aforementioned example, and a standby screen may be output by various conditions.

The electronic device 2100 may output a standby screen in the form of a blue screen, but embodiments of the disclosure are not limited thereto. As an example, the electronic device 2100 may extract only a shape of a specific object from data received from an external device and acquire an atypical object, and output a standby screen including the acquired atypical object.

Figure 22:
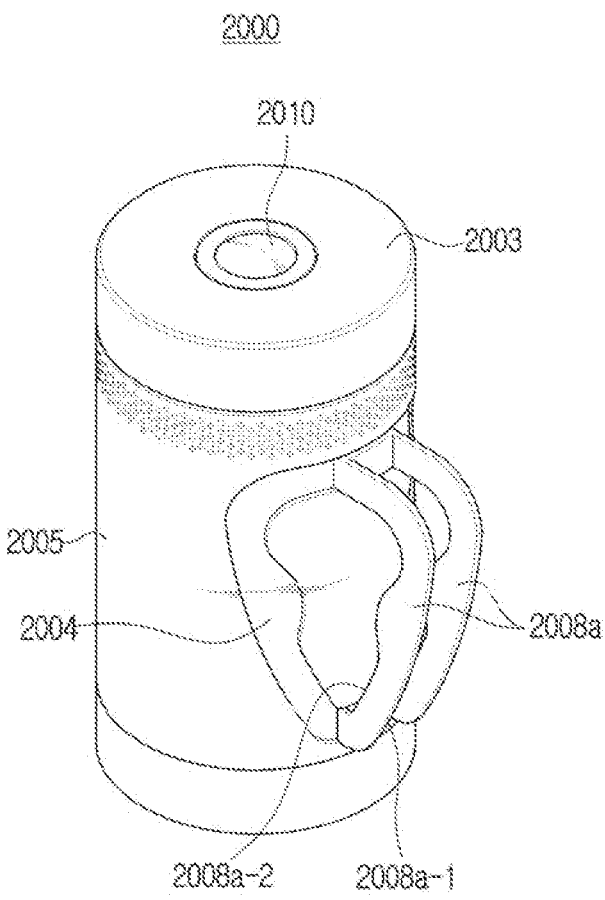
FIG. 22 is a perspective view illustrating an exterior of an electronic device according to other embodiments of the disclosure.

FIG. 22 is a perspective view illustrating the exterior of the electronic device 2100 according to other embodiments of the disclosure. Referring to FIG. 22, the electronic device 2100 may include a support (also referred to as "a handle" or "bent gripping part") 2008a.

The support 2008a according to the various embodiments of the disclosure may be a handle or a ring that is provided for a user to grip or move the electronic device 2100. Alternatively, the support 2008a may be a stand that supports the main body 2005 while the main body 2005 is laid down in the direction of the side surface.

The support 2008a may be connected in a hinge structure such that it is coupled to or separated from the outer circumferential surface of the main body 2005 as illustrated in FIG. 22, and it may be selectively separated from or fixed to the outer circumferential surface of the main body 2005 according to a user's need. The number, shape, or arrangement structure of the support 2008a may be implemented in various ways without restriction. The support 2008a may be housed inside the main body 2005, and it may be taken out and used by a user depending on needs. Alternatively, the support 2008a may be implemented as a separate accessory, and it may be attached to or detached from the electronic device 2100.

The support 2008a may include a first support surface 2008a-1 and a second support surface 2008a-2. The first support surface 2008a-1 may be a surface that faces the outer direction of the main body 2005 while the support 2008a is separated from the outer circumferential surface of the main body 2005, and the second support surface 2008a-2 may be a surface that faces the inner direction of the main body 2005 while the support 2008a is separated from the outer circumferential surface of the main body 2005.

The first support surface 2008a-1 may proceed toward the upper part of the main body 2005 from the lower part of the main body 2005 and get far from the main body 2005, and the first support surface 2008a-1 may have a shape that is flat or uniformly curved. In case the electronic device 2100 is held such that the outer side surface of the main body 2005 contacts the bottom surface, i.e., in case the electronic device 2100 is arranged such that the projection lens 2010 is toward the front surface direction, the first support surface 2008a-1 may support the main body 2005. In an embodiment including two or more supports 2008a, the emission angle of the head 2003 and the projection lens 2010 may be adjusted by adjusting the interval or the hinge opening angle of the two supports 2008a.

The second support surface 2008a-2 is a surface that contacts a user or an external holding structure when the support 2008a is supported by the user or the external holding structure, and it may have a shape corresponding to the gripping structure of the user's hand or the external holding structure such that the electronic device 2100 does not slip in case the electronic device 2100 is supported or moved. The user may make the projection lens 2010 face toward the front surface direction, and fix the head 2003 and hold the support 2008a, and move the electronic device 2100, and use the electronic device 2100 like a flashlight.

The support groove 2004 is a groove structure that is provided on the main body 2005 and wherein the support 2008a can be accommodated when it is not used, and as illustrated in FIG. 22, the support groove 2004 may be implemented as a groove structure corresponding to the shape of the support 2008a on the outer circumferential surface of the main body 2005. Through the support groove 2004, the support 2008a may be kept on the outer circumferential surface of the main body 2005 when the support 2008a is not used, and the outer circumferential surface of the main body 2005 may be maintained to be slick.

Alternatively, in a situation wherein the support 2008a is kept inside the main body 2005 and the support 2008a is needed, the electronic device 2100 may have a structure wherein the support 2008a is taken out to the outside of the main body 2005. In this case, the support groove 2004 may be a structure that is led into the inside of the main body 2005 so as to accommodate the support 2008a, and the second support surface 2008a-2 may include a door that adheres to the outer circumferential surface of the main body 2005 or opens or closes the separate support groove 2004.

The electronic device 2100 may include various kinds of accessories that are helpful in using or keeping the electronic device 2100. For example, the electronic device 2100 may include a protection case such that the electronic device 2100 can be easily carried while being protected. Alternatively, the electronic device 2100 may include a tripod that supports or fixes the main body 2005, and a bracket that can be coupled to an outer surface and fix the electronic device 2100.

Figure 23:
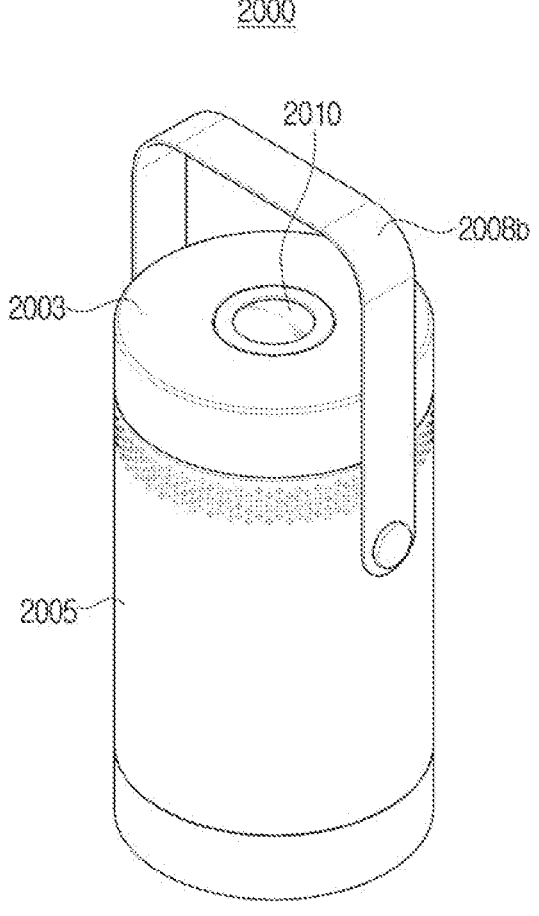
FIG. 23 is a perspective view illustrating an exterior of an electronic device according to still other embodiments of the disclosure.

FIG. 23 is a perspective view illustrating the exterior of the electronic device 2100 according to still other embodiments of the disclosure. Referring to FIG. 23, the electronic device 2100 may include a support (also referred to as "a handle") 2008b.

The support 2008b according to the various embodiments of the disclosure may be a handle or a ring that is provided for a user to grip or move the electronic device 2100. Alternatively, the support 2008b may be a stand that supports the main body 2005 so that the main body 2005 can be toward a random angle while the main body 2005 is laid down in the direction of the side surface.

Specifically, as illustrated in FIG. 23, the support 2008b may be connected with the main body 2005 at a predetermined point (e.g., a ⅔-¾ point of the height of the main body) of the main body 2005. When the support 2008b is rotated in the direction of the main body, the main body 2005 may be supported such that the main body 2005 can be toward a random angle while the main body 2005 is laid down in the direction of the side surface.

Figure 24:
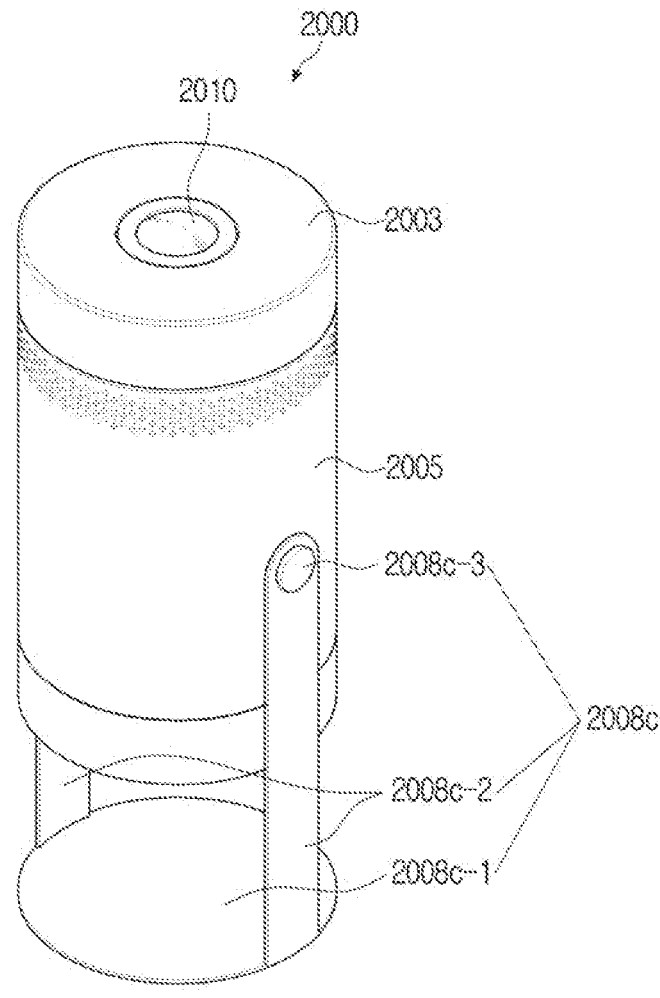
FIG. 24 is a perspective view illustrating an exterior of an electronic device according to still other embodiments of the disclosure.

FIG. 24 is a perspective view illustrating the exterior of the electronic device 2100 according to still other embodiments of the disclosure.

Referring to FIG. 24, the electronic device 2100 may include a support (or, it may be referred to as "a prop") 2008c. The support 2008c according to the various embodiments of the disclosure may include a base plate 2008c-1 that is provided to support the electronic device 2100 on the ground and two support members 2008c-2 connecting the base plate 2008c-1 and the main body 2005.

According to an embodiment of the disclosure, the heights of the two support members 2008c-2 are identical, and thus each one cross section of the two support members 2008c-2 may be coupled or separated by a groove and a hinge member 2008c-3 provided on one outer circumferential surface of the main body 2005.

The two support members may be hinge-coupled to the main body 2005 at a predetermined point (e.g., a point located at ⅓-½ of the height of the main body) of the main body 2005.

When the two support members and the main body are coupled by the hinge member 2008c-3, the main body 2005 is rotated based on a virtual horizontal axis formed by the two hinge members 2008c-3, and accordingly, the emission angle of the projection lens 2010 may be adjusted.

Figure 25A:
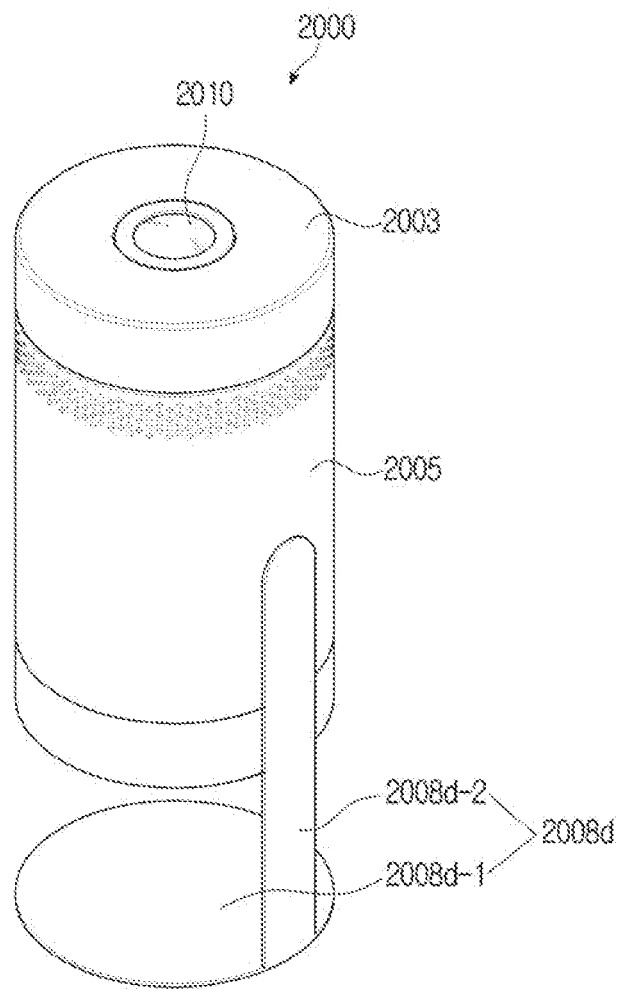
FIG. 25A is a perspective view illustrating an exterior of an electronic device according to still other embodiments of the disclosure.
Figure 25B:
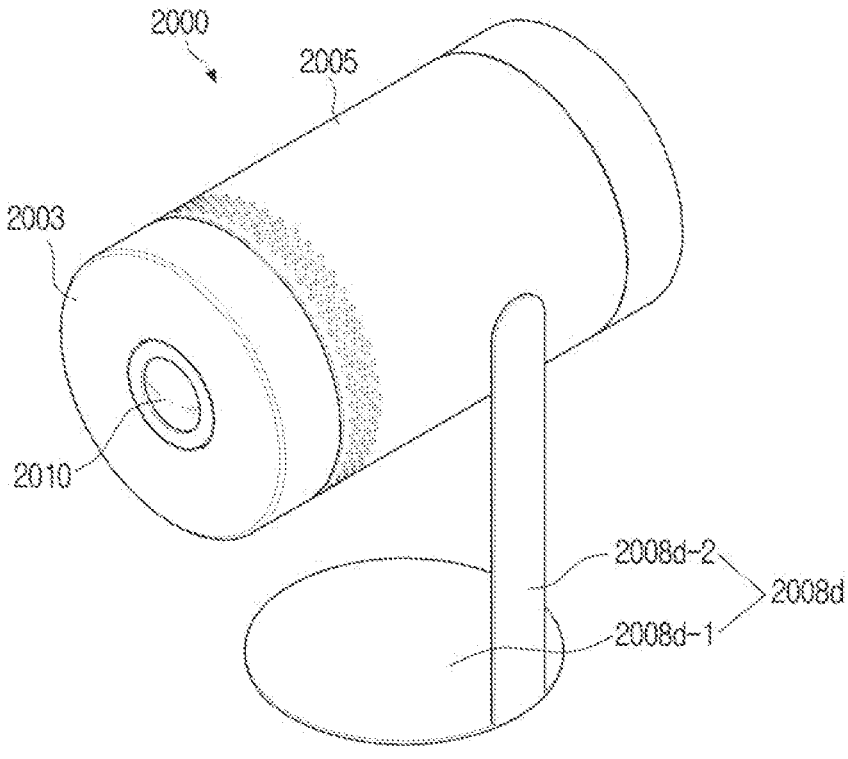
FIG. 25B is a perspective view illustrating a state wherein the electronic device in FIG. 25A is rotated.

FIG. 24 illustrates an embodiment wherein the two support members 2008c-2 are connected with the main body 2005, but embodiments of the disclosure are not limited thereto, and as shown in FIG. 25A and FIG. 25B, one support member and the main body 2005 may be connected by one hinge member.

FIG. 25A is a perspective view illustrating the exterior of the electronic device 2100 according to still other embodiments of the disclosure.

FIG. 25B is a perspective view illustrating a state wherein the electronic device 2100 in FIG. 25A is rotated.

Referring to FIG. 25A and FIG. 25B, the support 2008d according to the various embodiments of the disclosure may include a base plate 2008d-1 that is provided to support the electronic device 2100 on the ground and one support member 2008d-2 connecting the base plate 2008d-1 and the main body 2005.

Also, the cross section of the one support member 2008d-2 may be coupled or separated by a groove and a hinge member provided on one outer circumferential surface of the main body 2005.

When the one support member 2008d-2 and the main body 2005 are coupled by one hinge member, the main body 2005 may be rotated based on a virtual horizontal axis formed by the one hinge member, as in FIG. 25B.

The supports illustrated in FIGS. 22, 23, 24, 25A, and 25B are merely examples, and the electronic device 2100 can obviously include supports in various locations or forms.

According to various embodiments as described above, the electronic device may effectively adjust the projection region on which the projection image is projected based on a color appearing when the markers having a plurality of colors overlap each other.

The embodiments disclosure may be variously modified. Specific embodiments of the disclosure will be illustrated in the drawings and be described in detail in the detailed description. However, it is to be understood that the disclosure is not limited to specific embodiments, but includes various modifications, equivalents, and/or alternatives of the embodiments of the disclosure. Throughout the accompanying drawings, similar components will be denoted by similar reference numerals.

However, if it is determined that the detailed description of relevant known functions or components makes subject matters of the disclosure obscure, the detailed description thereof will be omitted.

The above-described embodiments may be modified in many different ways and the scope of the technical idea of the disclosure should not be limited to the embodiments set forth herein. Rather, these embodiments are provided in order to make the disclosure more thorough and complete and completely transfer the technical idea of the disclosure to those skilled in the art.

Terms used in the disclosure are used only to describe specific embodiments rather than limiting the scope of the disclosure. Singular forms used herein are intended to include plural forms unless context explicitly indicates otherwise.

In the disclosure, an expression "have", "may have", "include", "may include", or the like, indicates existence of a corresponding feature (for example, a numerical value, a function, an operation, or a component such as a part), and does not exclude existence of an additional feature.

In the disclosure, an expression "A or B", "at least one of A and B", "at least one of A or B", or the like, may include all possible combinations of items enumerated together. For example, "A or B", "at least one of A and B", or "at least one of A or B" may indicate all of 1) a case in only A is included, 2) a case in which only B is included, or 3) a case in which both of A and B are included.

Expressions "first", "second", or the like, used in the disclosure may indicate various components regardless of a sequence and/or importance of the components, will be used only in order to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled to another component or may be coupled to another component through the other component (for example, a third component).

On the other hand, when it is mentioned that any component (for example, a first component) is "directly coupled" or "directly connected" to another component (for example, a second component), it is to be understood that still another component (for example, a third component) is not present between any component and the another component.

An expression "configured (or set) to" used in the disclosure may be replaced by an expression "suitable for", "having the capacity to" "designed to", "adapted to", "made to", or "capable of" depending on a situation. A term "configured (or set) to" may not necessarily mean "specifically designed to" in hardware.

Instead, an expression "a device configured to" may mean that the device may "do" together with other devices or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory device.

In the embodiments, a "module" or a "part" may perform at least one function or operation, and be implemented by hardware or software or be implemented by a combination of hardware and software. In addition, a plurality of "modules" or a plurality of "parts" may be integrated in at least one module and be implemented by at least one processor except for a "module" or a "parts" that needs to be implemented by specific hardware.

Various elements and regions in the drawings are schematically illustrated. Therefore, the spirit of the disclosure is not limited by relative sizes or intervals illustrated in the accompanying drawings.

The various embodiments described above may be implemented in a computer and/or a computer readable recording medium using software, hardware, or a combination of software and hardware. When implemented as hardware, the embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electrical units for performing functions. In some cases, the embodiments described in the disclosure may be implemented by the processor itself. When implemented as software, the embodiments such as procedures and functions described in the specification may be implemented by separate software modules. Each of the software modules may perform one or more functions and operations described in the specification.

The methods according to various embodiments of the disclosure described above may be stored in a non-transitory readable medium. Such a non-transitory readable medium may be installed in various devices to be used.

The non-transitory readable medium means a medium that semi-permanently stores data and is readable by a device, not a medium that stores data for a short period of time such as a register, a cache, a memory, or the like. Specifically, programs for performing various methods described above may be provided in a state of being stored in a non-transitory computer readable medium such as a compact disk (CD), a digital versatile disk (DVD), a hard disk, a Blu-ray disk, a universal serial bus (USB), a memory card, or a read only memory (ROM).

In addition, according to an embodiment, the methods according to various embodiments of the disclosure may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In case of the online distribution, at least a part of the computer program product may be at least temporarily stored in a storage medium such as a memory of a server of a manufacturer, a server of an application store, or a relay server or be temporarily created.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A control method of an electronic device that projects a projection image, the control method comprising:

projecting, by the electronic device, a first test projection image including at least one marker of a first color while an external device projects a second test projection image including at least one marker of a second color that is different from the first color;

obtaining a captured image of projection regions on which the first test projection image and the second test projection image are projected while a projection region of the projection regions on which at least one of the first test projection image or the second test projection image is projected is changed; and identifying an overlapping region between the first test projection image and the second test projection image based on at least one of (i) a third marker of a third color or (ii) the marker of the first color and the marker of the second color, in the captured image, the marker of the third color being the marker of the first color and the marker of the second color overlapping each other, and the third color being different from the first color and the second color, wherein the control method further comprises:

based on the overlapping region being identified, obtaining temperature information of the electronic device and temperature information of the external device, and projecting, by the electronic device, a projection image on a region other than the overlapping region in the projection regions.

2. The control method as claimed in claim 1, further comprising:

projecting the first test projection image including a first indicator for guiding the first test projection image and the second test projection image to overlap each other according to an overlapping operation; and projecting the first test projection image including a second indicator based on identifying that the first test projection image and the second test projection image overlap each other according to the overlapping operation.

3. The control method as claimed in claim 1, further comprising:

controlling a motor to adjust a projection direction of the projection image to change the projection region on which the first test projection image is projected based on a result of the identifying; and transmitting, to the external device, a control instruction to adjust a projection position based on a result of the identifying.

4. The control method as claimed in claim 3, further comprising controlling the motor to fix the projection position of the first test projection image and transmitting, to the external device, a control instruction for fixing the projection position of the second test projection image based on identifying that the first test projection image and the second test projection image overlap each other.

5. The control method as claimed in claim 1, further comprising transmitting, to the external device, a control instruction for projecting, on the overlapping region, a same image as an image displayed on the overlapping region among projection images projected by the electronic device based on identifying that the first test projection image and the second test projection image overlap each other.

6. The control method as claimed in claim 1, wherein the projecting the projection image on the region comprises projecting a first projection image on the region other than the overlapping region based on identifying that a temperature of the electronic device is higher than a temperature of the external device based on the temperature information of the electronic device and the temperature information of the external device, and wherein the control method further comprises transmitting, to the external device, a control instruction for projecting a second projection image on the region other than the overlapping region based on identifying that the temperature of the electronic device is lower than the temperature of the external device based on the temperature information of the electronic device and the temperature information of the external device.

7. The control method as claimed in claim 1, further comprising projecting the projection image for displaying a first image and transmitting, to the external device, a control instruction for projecting the projection image for displaying a second image, based on identifying that the first test projection image and the second test projection image overlap each other, and the overlapping region is smaller than a predetermined set region.

8. The control method as claimed in claim 1, further comprising projecting, on the region other than the overlapping region, the projection image based on identifying that the first test projection image and the second test projection image overlap each other, and the overlapping region is included in the projection region on which the first test projection image is projected.

9. The control method as claimed in claim 1, wherein the third color is a color corresponding to a combination of light of the first color and light of the second color.

10. An electronic device that projects a projection image, the electronic device comprising:

a communication interface;

a projector configured to project the projection image;

a camera configured to capture an image of a region on which the projection image is projected;

a memory configured to store at least one instruction; and a processor configured to execute the at least one instruction to:

control the projector to project a first test projection image including at least one marker of a first color while an external device projects a second test projection image including at least one marker of a second color that is different from the first color, obtain, through the camera, a captured image by capturing an image of projection regions on which the first test projection image and the second test projection image are projected while a projection region of the projection regions on which at least one of the first test projection image or the second test projection image is projected is changed, and identify an overlapping region between the first test projection image and the second test projection image based on at least one of (i) a third marker of a third color or (ii) the marker of the first color and the marker of the second color, the marker of the third color being the marker of the first color and the marker of the second color overlapping each other, and the third color being different from the first color and the second color, wherein the processor is configured to execute the at least one instruction to:

based on the overlapping region being identified, obtain temperature information of the electronic device and temperature information of the external device, and control the projector to project a projection image on a region other than the overlapping region among the projection regions.

11. The electronic device as claimed in claim 10, wherein the processor is further configured to execute the at least one instruction to control the projector to project the first test projection image including a first indicator for guiding the first test projection image and the second test projection image to overlap each other according to an overlapping operation, and control the projector to project the first test projection image including a second indicator based on identifying that the first test projection image and the second test projection image overlap each other according to the overlapping operation.

12. The electronic device as claimed in claim 10, further comprising a motor that controls the projector to adjust a projection direction of the projection image, wherein the processor is further configured to execute the at least one instruction to:

control the motor to change the projection region on which the first test projection image is projected based on a result of the identification, and control the communication interface to transmit, to the external device, a control instruction for adjusting a projection position based on the result of the identification.

13. The electronic device as claimed in claim 12, wherein the processor is further configured to execute the at least one instruction to control the motor to fix the projection position of the first test projection image, and control the communication interface to transmit, to the external device, a control instruction for fixing the projection position of the second test projection image, based on identifying that the first test projection image and the second test projection image overlap each other.

14. The electronic device as claimed in claim 10, wherein the processor is further configured to execute the at least one instruction to control the communication interface to transmit, to the external device, a control instruction for projecting, on the overlapping region, a same image as an image displayed on the overlapping region among projection images projected by the electronic device, based on identifying that the first test projection image and the second test projection image overlap each other.

15. The electronic device as claimed in claim 10, wherein the processor is further configured to execute the at least one instruction to:

control the projector to project a first projection image on the region other than the overlapping region based on identifying that a temperature of the electronic device is higher than a temperature of the external device based on the temperature information of the electronic device and the temperature information of the external device, and control the communication interface to transmit, to the external device, a control instruction for projecting a second projection image on the region other than the overlapping region based on identifying that the temperature of the electronic device is lower than the temperature of the external device based on the temperature information of the electronic device and the temperature information of the external device.

16. A control method of an electronic device that projects a projection image, the control method comprising:

projecting, by the electronic device, a first test projection image including at least one marker of a first color while an external device projects a second test projection image including at least one marker of a second color that is different from the first color;

obtaining a captured image of projection regions on which the first test projection image and the second test projection image are projected while a projection region of the projection regions on which at least one of the first test projection image or the second test projection image is projected is changed; and identifying an overlapping region between the first test projection image and the second test projection image based on at least one of (i) a third marker of a third color or (ii) the marker of the first color and the marker of the second color, in the captured image, the marker of the third color being the marker of the first color and the marker of the second color overlapping each other, and the third color being different from the first color and the second color, wherein the control method further comprises:

based on identifying that the first test projection image and the second test projection image overlap each other, identifying a distance between the external device and the electronic device based on the marker of the third color, outputting first audio and transmitting, to the external device, a control instruction for controlling the external device to output second audio based on identifying that the distance between the external device and the electronic device is equal to or larger than a predetermined distance, and outputting third audio and transmitting, to the external device, a control instruction for controlling the external device to output the third audio based on identifying that the distance between the external device and the electronic device is smaller than the predetermined distance.

* * * * *